US012695794B1

(12) United States Patent
Korhonen et al.

(10) Patent No.: US 12,695,794 B1
(45) Date of Patent: Jul. 28, 2026

(54) POLICY VIOLATION DETECTION USING A MULTI-SOURCED UNIFIED DATA MODEL

(71) Applicant: Netskope, Inc., Santa Clara, CA (US)

(72) Inventors: Eetu Lassi Oskari Korhonen, Haninge (SE); Sayan Hazra, Oer-Erkenschwick (DE); Hardik Shelat, Bengaluru (IN); Kaushik Mukherjee, Hyderabad (IN)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 19/384,212

(22) Filed: Nov. 10, 2025

(51) Int. Cl.
*H04L 9/40* (2022.01)
*H04L 41/02* (2022.01)
*H04L 41/16* (2022.01)

(52) U.S. Cl.
CPC ............ *H04L 63/20* (2013.01); *H04L 41/024* (2013.01); *H04L 41/16* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 9,842,220 | B1 * | 12/2017 | Brisebois | ................ H04L 63/20 |
| 11,973,781 | B2 * | 4/2024 | Weingarten | ............... G06F 8/61 |
| 2014/0325643 | A1 * | 10/2014 | Bart | .................... H04L 63/1425 |
| | | | | 726/22 |
| 2017/0286671 | A1 * | 10/2017 | Chari | ..................... G06F 21/552 |
| 2018/0150338 | A1 * | 5/2018 | Markello | ............ G06F 11/3409 |
| 2020/0286016 | A1 * | 9/2020 | Singh | ...................... H04W 4/70 |
| 2025/0005129 | A1 * | 1/2025 | Shelef | ..................... G06F 21/44 |

* cited by examiner

*Primary Examiner* — Bassam A Noaman

(57) ABSTRACT

Systems, devices, and computer-implemented methods are presented for monitoring distinct enterprise systems for violations of security policies. In one embodiment, a network security system collects data from a plurality of monitored systems within an enterprise and generates a unified data model using the data. The unified data model establishes connections between two or more of the monitored systems, and more particularly, between objects within the monitored systems based on matching corresponding parameters. The connections provide the network security system with insight into other data in the monitored systems allowing the network security system to identify violations of security policies by leveraging the connections. The network security system can output alerts and remediate the violations in a given monitored system.

20 Claims, 10 Drawing Sheets

305 — Obtain data from monitored systems associated with an enterprise

310 — Generate a unified data model using the data from the monitored systems and establish connections in the unified data model between the monitored systems based on matching parameters of objects of the data across the monitored systems 315 — Identify a violation of a security policy of the enterprise based on searching the unified data model, including leveraging the connections and parameters of the objects to find corresponding information in violation of the security policy 320 — Perform a remediation of the violation of the security policy

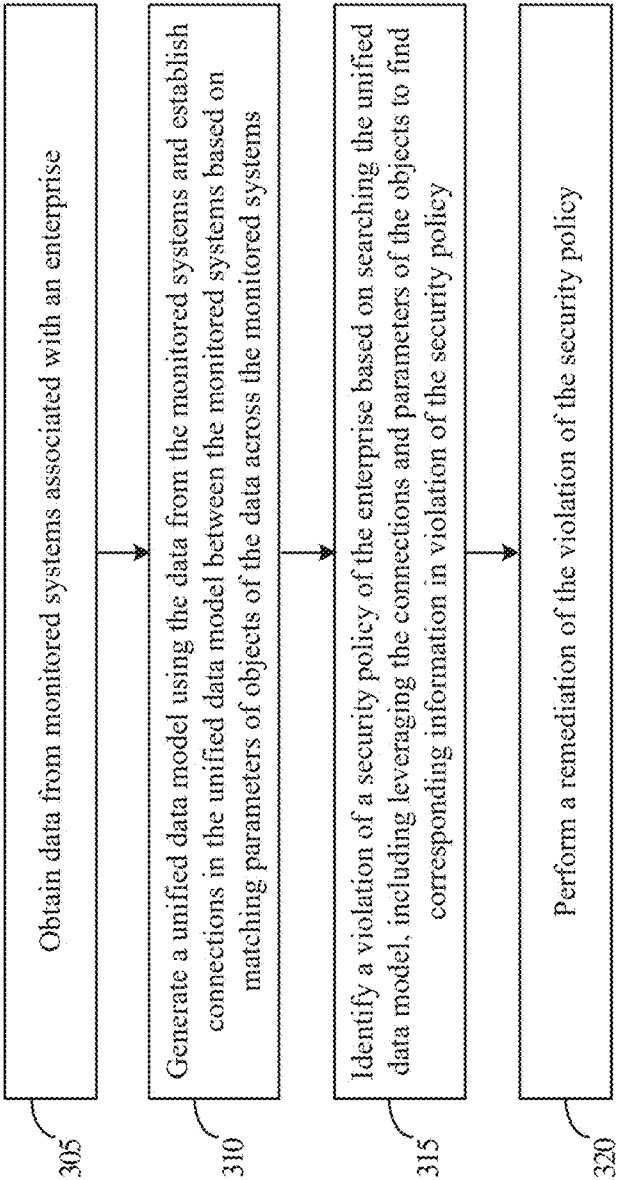

305 Obtain data from monitored systems associated with an enterprise

310 Generate a unified data model using the data from the monitored systems and establish connections in the unified data model between the monitored systems based on matching parameters of objects of the data across the monitored systems 315 Identify a violation of a security policy of the enterprise based on searching the unified data model, including leveraging the connections and parameters of the objects to find corresponding information in violation of the security policy 320 Perform a remediation of the violation of the security policy

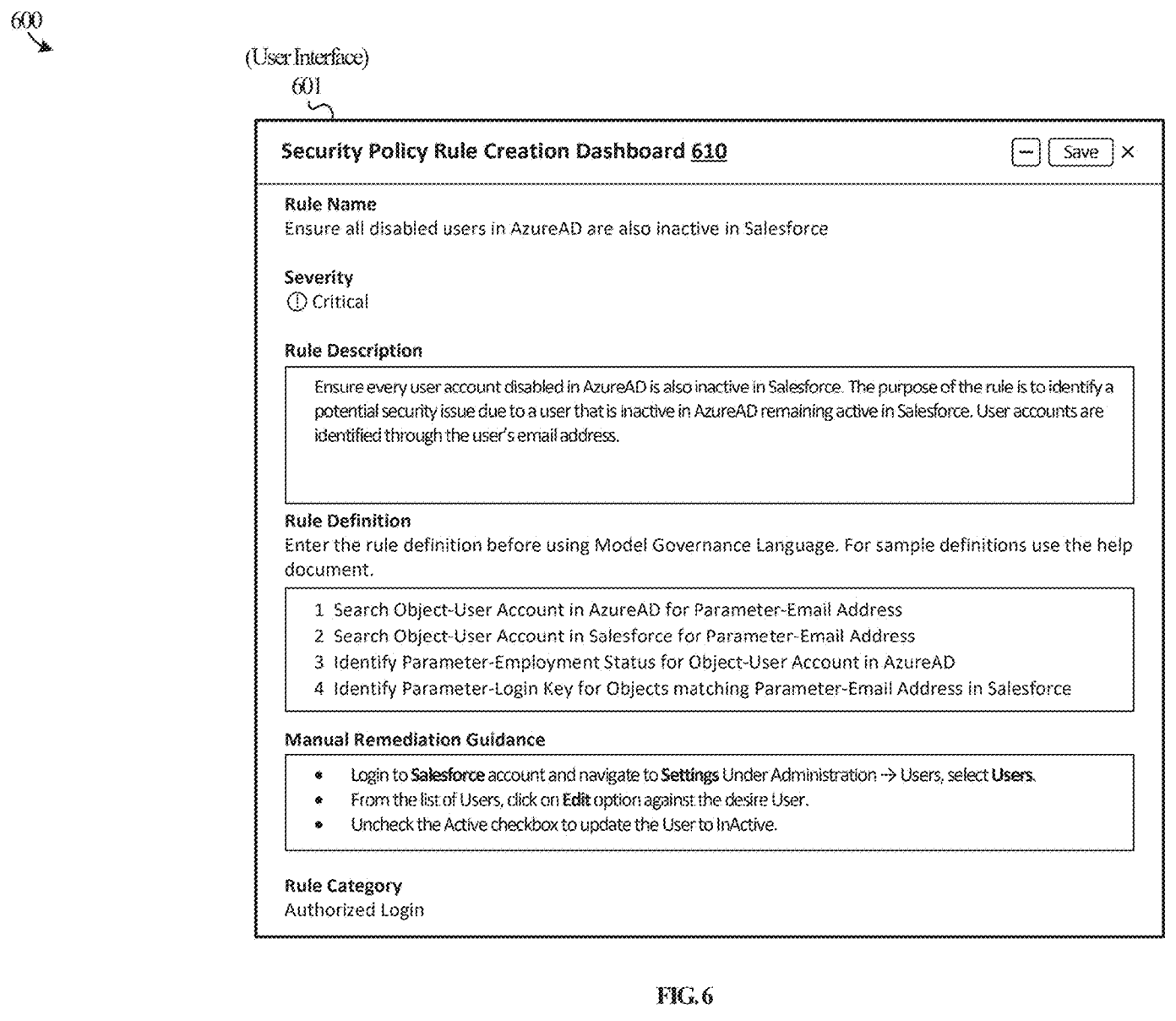

(User Interface) 601

600

Security Policy Rule Creation Dashboard 610

[ – ] [ Save ] ✕

Rule Name
Ensure all disabled users in AzureAD are also inactive in Salesforce

Severity
ⓘ Critical

Rule Description

Ensure every user account disabled in AzureAD is also inactive in Salesforce. The purpose of the rule is to identify a potential security issue due to a user that is inactive in AzureAD remaining active in Salesforce. User accounts are identified through the user's email address.

Rule Definition
Enter the rule definition before using Model Governance Language. For sample definitions use the help document.

1  Search Object-User Account in AzureAD for Parameter-Email Address
2  Search Object-User Account in Salesforce for Parameter-Email Address
3  Identify Parameter-Employment Status for Object-User Account in AzureAD
4  Identify Parameter-Login Key for Objects matching Parameter-Email Address in Salesforce

Manual Remediation Guidance

- Login to Salesforce account and navigate to Settings Under Administration → Users, select Users.
- From the list of Users, click an Edit option against the desire User.
- Uncheck the Active checkbox to update the User to InActive.

Rule Category
Authorized Login

FIG. 6

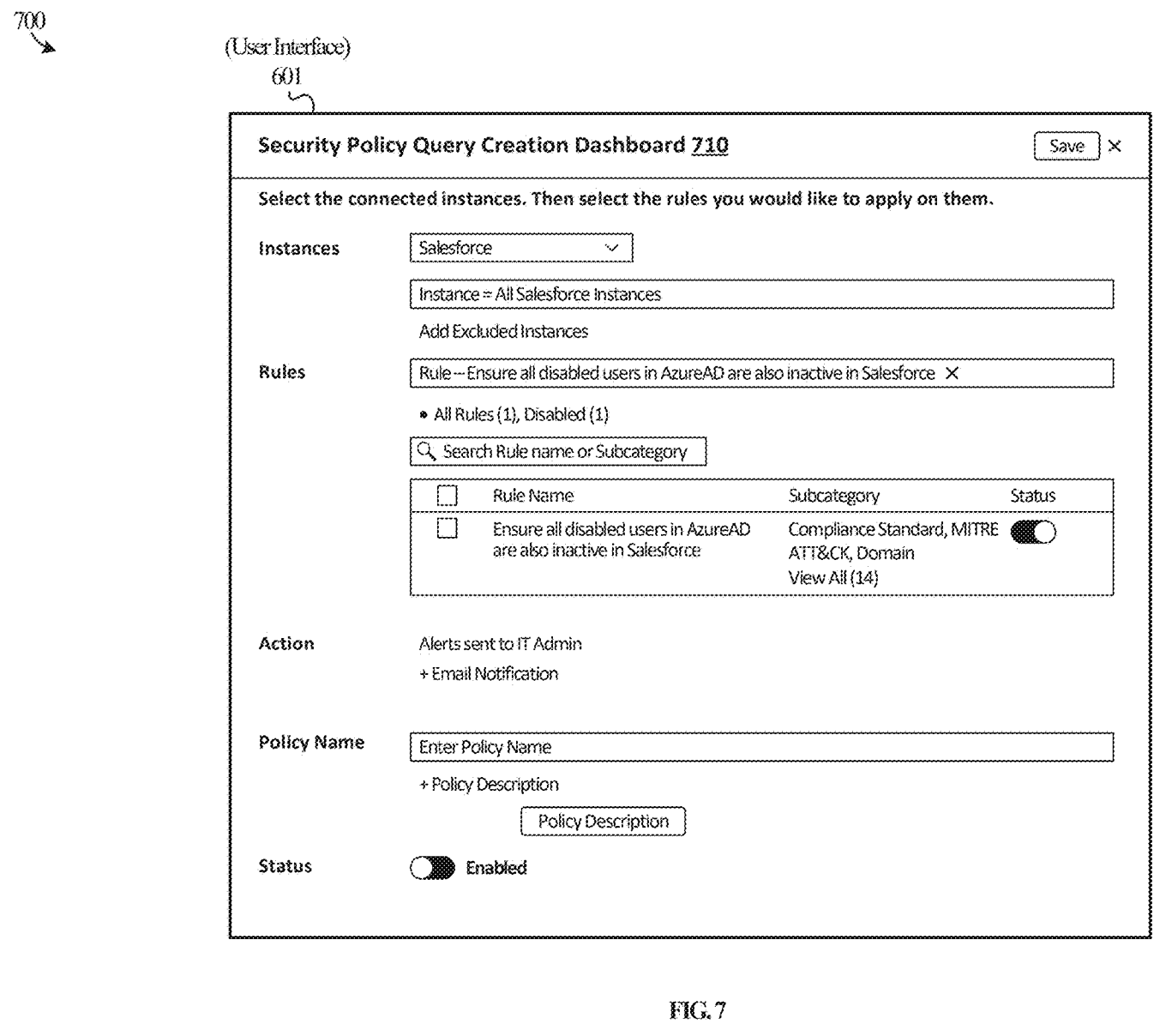

(User Interface)
601

700

Security Policy Query Creation Dashboard 710                    Save    ✕

Select the connected instances. Then select the rules you would like to apply on them.

Instances        Salesforce        ⌄

Instance = All Salesforce Instances

Add Excluded Instances

Rules        Rule -- Ensure all disabled users in AzureAD are also inactive in Salesforce    ✕

● All Rules (1), Disabled (1)

🔍 Search Rule name or Subcategory

| ☐ | Rule Name | Subcategory | Status |
|---|---|---|---|
| ☐ | Ensure all disabled users in AzureAD are also inactive in Salesforce | Compliance Standard, MITRE ATT&CK, Domain<br>View All (14) | ◖ |

Action        Alerts sent to IT Admin

+ Email Notification

Policy Name        Enter Policy Name

+ Policy Description

Policy Description

Status        ◖ Enabled

FIG. 7

Figure 9:
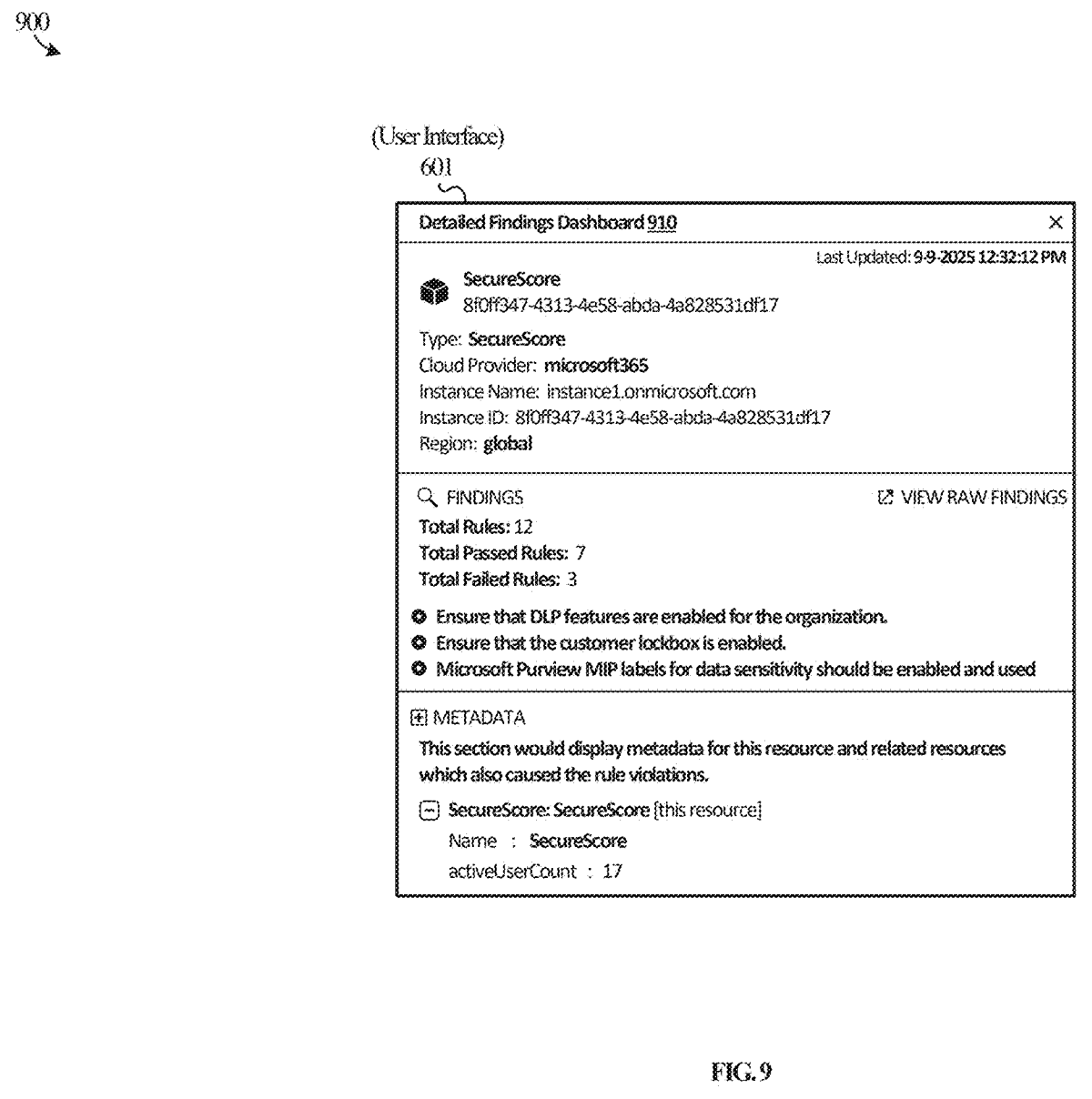

(User Interface)
601

Detailed Findings Dashboard 910                                    ✕

Last Updated: 9-9-2025 12:32:12 PM

⬢ SecureScore
8f0ff347-4313-4e58-abda-4a828531df17

Type: SecureScore
Cloud Provider: microsoft365
Instance Name: instance1.onmicrosoft.com
Instance ID: 8f0ff347-4313-4e58-abda-4a828531df17
Region: global

🔍 FINDINGS                                           ⧉ VIEW RAW FINDINGS

Total Rules: 12
Total Passed Rules: 7
Total Failed Rules: 3

⊗ Ensure that DLP features are enabled for the organization.
⊗ Ensure that the customer lockbox is enabled.
⊗ Microsoft Purview MIP labels for data sensitivity should be enabled and used

⊞ METADATA

This section would display metadata for this resource and related resources
which also caused the rule violations.

⊟ SecureScore: SecureScore [this resource]

Name : SecureScore
activeUserCount : 17

POLICY VIOLATION DETECTION USING A MULTI-SOURCED UNIFIED DATA MODEL

TECHNICAL FIELD

Embodiments of the present disclosure relate generally to network security technology, and in particular, to network security monitoring across monitored systems.

BACKGROUND

Enterprise software platforms like Salesforce, Workday, and Microsoft 365 offer cloud-based solutions to support functionality, such as data management, workflow automation, resource planning, and user access control, which enables organizations to manage core business functions and secure sensitive data. These systems secure assets like documents, user configurations, and access controls in compliance with security policies by using built-in tools. For example, the systems may utilize real-time activity tracking, automated audits, and rule-based controls tailored to specific risk and threat profiles. These systems balance security measures with legitimate use to avoid disrupting operations, however, each asset carries unique risk levels, so creating policies that adapt to these differences based on usage patterns and organizational context is challenging.

Manually developing individualized security policies consumes time and invites errors. In lieu of such manual efforts, an organization may supplement risk and security enforcement tools with third-party integrations like Security Information and Event Management (SIEM) systems or Cloud Access Security Brokers (CASB) applications. Despite increases in operational efficiency by integrating with third-party tools, enterprise systems typically do not utilize external contextual data, such as organizational requirements or asset-specific risk profiles, which hinders precise policy implementation. Security engineers can tailor the enterprise systems or third-party applications to incorporate these requirements into system-compatible policies, but this process becomes difficult as the number of applications and assets increases.

In other existing solutions, system administrators create custom scripts to address specific correlations and enforcement needs on a case-by-case basis. These scripts handle known issues but lack scalability and fail to detect unknown anomalies without prior identification. Alternatively, systems integrated with a centralized identity and access management (IAM) system, enforce access controls based on group memberships defined by organizational charts. For example, policies might grant read-only access to one group while allowing full access to another. This approach requires all systems to support IAM integration and access the relevant data models, which is not always practical, and thus, restricts use-cases in diverse enterprise settings. In environments with non-integrated systems, this method leaves gaps in policy enforcement. As enterprise systems grow in complexity, these methods struggle to deliver automated, granular, and context-aware security policy enforcement, underscoring the need for more adaptable solutions.

SUMMARY

Various embodiments of the present technology relate to security policy monitoring and enforcement across enterprise systems. More particularly, embodiments include systems, devices, and computer-implemented methods for providing a centralized network security system capable of collecting data from several enterprise applications and analyzing the data to gather insight across applications. In this way, the network security system can monitor assets or objects in one application and obtain information from another application that may be otherwise unknown to the former application, achieving a unified data model that allows the network security system to monitor and enforce security policies of the enterprise regardless of integrations, or lack thereof, across the applications.

In an example embodiment, a network security system collects data from a plurality of monitored systems within an enterprise and generates a unified data model using the data. The unified data model establishes connections between two or more of the monitored systems, and more particularly, between objects within the monitored systems based on matching corresponding parameters. The connections provide the network security system with insight into other data in the monitored systems allowing the network security system to identify violations of security policies by leveraging the connections.

In another example embodiment, a computing apparatus is provided that includes one or more computer-readable storage media and program instructions stored on the one more computer-readable storage media executable by a processing device that, based on being read and executed by the processing device, direct the processing device to perform various functions. The program instructions direct the processing device to obtain first data from a first monitored system associated with an enterprise, obtain second data from a second monitored system associated with the enterprise, and and generate a unified data model using the first and second data. In generating the unified data model, the program instructions direct the processing device to identify a first parameter of a first object in the first data and a first parameter of a second object in the second data based at least in part on the first parameters of the first and second objects matching, and establish a connection between the first object and the second object based on the identification. The program instructions also direct the processing device to identify a violation of a security policy of the enterprise based on searching the unified data model, where searching includes leveraging the connection and a second parameter of the first object to find corresponding information in the second data in violation of the security policy.

In yet another example embodiment, a system including a data collection engine, a connector engine, and a security policy query engine is provided. The data collection engine is configured to obtain first data from a first monitored system associated with an enterprise and obtain second data from a second monitored system associated with the enterprise. The connector engine is configured to generate a unified data model using the first and second data. In generating the unified data model, the connector engine is configured to identify a first parameter of a first object in the first data and a first parameter of a second object in the second data based at least in part on the first parameters of the first and second objects matching, and establish a connection between the first object and the second object based on the identification. The security policy query engine is configured to identify a violation of a security policy of the enterprise based on searching the unified data model, where searching includes leveraging the connection and a second parameter of the first object to find corresponding information in the second data in violation of the security policy.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 3 illustrates a method for performing security policy queries by a network security system, according to some embodiments.

FIG. 6 illustrates an example user interface of a network security system, according to some embodiments.

FIG. 7 illustrates an example user interface of a network security system, according to some embodiments.

FIG. 9 illustrates an example user interface of a network security system, according to some embodiments.

DETAILED DESCRIPTION

Figure 1:
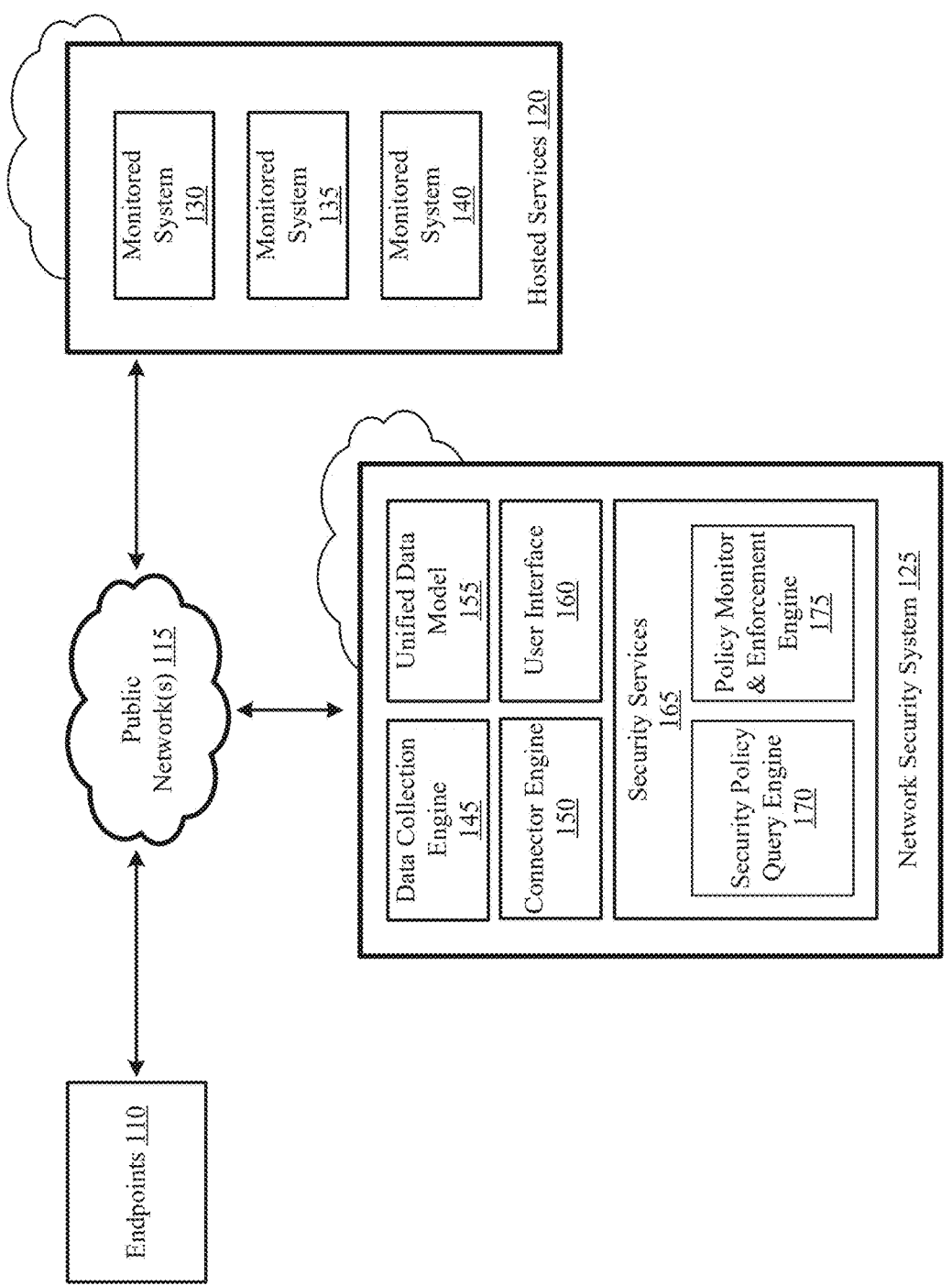
FIG. 1 illustrates a system including a cloud-based network security system that monitors for violations of security policies between endpoint users and monitored systems hosted by an enterprise, according to some embodiments.

Various embodiments of the present technology resolve the issues described above with respect to security policy monitoring and enforcement across enterprise applications by generating and querying a unified data model constructed from the various applications used by an enterprise. Enterprise applications, like cloud-based platforms modeled to deliver Software-as-a-Service (SaaS) (referred to as hosted services), provide an organization and its users with functionality like data management, workflow automation, resource planning, and user access control, among other services, enabling the organization to manage core business functions and secure sensitive data without maintaining associated infrastructure, hardware, and software. In utilizing such cloud-based applications hosted by an enterprise (interchangeably referring to the terms applications and monitored systems), network security and protection of sensitive data is a key consideration that grows more complicated as the number of users and applications for an enterprise increases.

Cloud-based applications instantiated for an enterprise often operate self-sufficiently with respect to core functionality, including risk and security management, to protect users and the enterprise from data loss, data theft, anomalous user behavior, and the like. For example, each application, to remain compliant with regulatory and enterprise security policies, may perform various activities to detect and prevent behavior that would jeopardize the security of the enterprise, its users, and its data, such as by auditing user activity, implementing rule-based security measures, and more. However, an enterprise might have hundreds or thousands of users each having access to one or more of the applications, leading to a complex and diverse architecture for which enterprise-wide security policies need to be applied, which might not be achievable at an individual application level without significant customization and manual effort.

To account for enterprise-wide security policies for large information technology (IT) architectures, security policies at the application level might also need to be tailored to specific risk and threat profiles based on enterprise-wide considerations. As mentioned, the cloud-based applications might employ built-in tools to provide risk and security management functionality, but the applications typically balance security measures with legitimate use to avoid disrupting operations. However, each asset or object managed by an application carries unique risk levels to the enterprise, so creating policies that adapt to these differences based on usage patterns and organizational context is challenging.

To reduce or circumvent manual efforts or additional costs to customize each enterprise application, an organization may supplement risk and security enforcement tools with third-party integrations like Security Information and Event Management (SIEM) systems or Cloud Access Security Brokers (CASB) applications. Despite increases in operational efficiency by integrating with third-party tools, enterprise systems typically do not utilize external contextual data, such as organizational requirements or asset-specific risk profiles, which hinders precise policy implementation. Security engineers can tailor the enterprise systems or third-party applications to incorporate these requirements into system-compatible policies, but this process also becomes difficult as the number of applications and assets increases.

In other existing solutions, system administrators create custom scripts to address specific correlations and enforcement needs on a case-by-case basis. These scripts handle known issues but lack scalability and fail to detect unknown anomalies without prior identification. Alternatively, systems integrated with a centralized identity and access management (IAM) system, enforce access controls based on group memberships defined by organizational charts. For example, policies might grant read-only access to one group while allowing full access to another. This approach requires all systems to support IAM integration and access the relevant data models, which is not always practical, and thus, restricts use-cases in diverse enterprise settings. In environments with non-integrated systems, this method leaves gaps in policy enforcement.

To overcome the above-described issues, a cloud-based network security system is provided herein that monitors numerous enterprise applications to detect violations of enterprise security policies based on anomalous user activity and/or erroneous data, and enforces the enterprise security policies by remediating the violations, such as blocking access to an application, preventing access to an asset or object of an application, or correcting information managed by an enterprise application. More specifically, the network security system may intercept and analyze traffic between endpoints (i.e., client devices, user devices) and hosted services and obtain data from hosted services using Application Programming Interfaces (APIs) to obtain enterprise-wide data. By request from a user, or by detection of a change in data at a system or application monitored by the network security system (i.e., monitored systems), the network security system may generate a unified data model that establishes connections between two or more of the monitored systems among the hosted services, providing the network security system with insight into corresponding data of one or more of the monitored systems that would otherwise be unknown to other monitored systems, and query the unified data model to identify violations of security policies by leveraging the connections established in the unified data model.

In generating the unified data model, the network security system may correlate configuration states, objects, and object data and parameters from multiple unrelated monitored systems into a unified graph-based data model. In various embodiments, the network security system collects security metadata from the monitored systems and normalizes the data into a single database where resources appear as connected nodes upon the establishment of connections between ones of the monitored systems. This enables cross-platform visibility, allowing the network security system to link entities—such as user accounts across systems using identifiers like email addresses—that individual monitored systems cannot correlate natively. The system employs a custom query language and Cypher queries to evaluate these connections, identifying risks and configuration drifts through periodic assessments.

With respect to querying and security policy violation detection, the network security system offers the creation or selection (e.g., pre-configured) of anomaly detection queries for implementation by a system administrator reducing or eliminating manual efforts to detect anomalous data or behavior in violation of enterprise security policies. For example, the end user may input, with the facilitation of a query generation engine of the network security system that exposes language shortcuts such that the end user need not know a query language native to the network security system, objects and parameters to be monitored, as well as rules to be applied, that can be executed by the network security system as opposed to custom generated scripts engineered by an administrator or software engineer. As a result, both coding expertise and manual effort may be reduced.

This approach enhances security policy enforcement by leveraging external context to inform granular controls. For example, it combines user role data from a monitored system (e.g., Workday) with document entitlements from another monitored system (e.g., Microsoft OneDrive) to enforce access restrictions beyond a single platform's capabilities. The network security system may map each platform's security posture, including users, configurations, and authentication methods, and supports user-defined or automated rules to trigger alerts or remediation workflows. By maintaining a dynamic, customer-specific data model updated via APIs or direct input, the network security system overcomes the limitations of manual processes, non-scalable scripts, and IAM dependency, providing automated, context-aware policy enforcement across diverse enterprise environments.

Advantageously, the disclosed network security system and methods of operation thereof provide centralized security policy monitoring and enforcement applicable across multiple enterprise systems not otherwise integrated or in communication with one another. More particularly, the network security system can detect violations of enterprise security policies and enforce complex logic for security controls for independent software platforms by generating and creating a data model that interconnects objects (e.g., resources, assets, or the like) and associated parameters from an enterprise application with corresponding objects and parameters from other enterprise applications. In this way, the network security system utilizes interpolated connections between enterprise applications to enforce security controls on objects based on information one or more of the enterprise applications would otherwise not have access to, allowing for increased reliability with respect to enforcement decisions.

Turning now to FIG. 1, system 100 illustrates components for providing cloud-based network security services including monitoring and enforcement of security policies based on actions between client devices (e.g., endpoints) and hosted services 130 as well as data stored and managed on behalf of client devices by hosted services 130. System 100 includes endpoints 110, public network 115, hosted services 120, and network security system 125. System 100 may include additional components not described here for simplicity.

Endpoints 110 include user devices such as desktop computers, laptop computers, mobile devices (e.g., smartphones, tablets), internet of things (IoT) devices, and the like. In some embodiments, endpoints 110 includes gateways or routers used, for example, at physical enterprise office locations for routing traffic between a subnetwork or private network and public network 115. Endpoints 110 represent any number of computing devices that access and utilize hosted services 120. Endpoints 110 may be generally represented by computing device 1000 of FIG. 10, and may include processors, output devices, communication interfaces, input devices, memory, and the like, all not depicted here for clarity. Endpoints 110 may be used to access content (e.g., documents, images, and the like) stored in hosted services 120 and otherwise interact with applications hosted by hosted services 120, such as one or more of monitored systems 130, 135, and 140. Endpoints 110 may also be used to access or communicate with other servers, computing devices, and services not shown or described in detail here for simplicity.

Public network 115 may be any public network including, for example, the Internet. Public network 115 couples endpoints 110, network security system 125, and hosted services 120 such that any may communicate with any other via public network 115. The actual communication path can be point-to-point over public network 115 and may include communication over private networks (not shown). Communications can occur over public network 115 using a variety of network technologies, for example, private networks, Virtual Private Network (VPN), multiprotocol label switching (MPLS), local area network (LAN), wide area network (WAN), Public Switched Telephone Network (PSTN), Session Initiation Protocol (SIP), wireless networks, point-to-point networks, star network, token ring network, hub network, Internet, or the like. Communications may use a variety of protocols. Communications can use appropriate application programming interfaces (APIs) and data interchange formats, for example, Representational State Transfer (REST), JavaScript Object Notation (JSON), Extensible Markup Language (XML), Simple Object Access Protocol (SOAP), Java Message Service (JMS), Java Platform Module System, and the like. Additionally, a variety of authorization and authentication techniques, such as user-name/password, Open Authorization (OAuth), Kerberos, SecureID, digital certificates and more, can be used to secure communications.

Hosted services 120 may include cloud computing and storage services, financial services, e-commerce services, asset management services, resource planning services, or any type of applications, websites, or platforms that provide cloud-based storage, application, or web services. Hosted services 120 can be referred to as cloud services, cloud applications, cloud storage applications, cloud computing applications, monitored systems, or the like. Hosted services 120 provide functionality to users that can be implemented in the cloud and that can be the target of data loss prevention (DLP) policies, unauthorized access policies, or other enterprise security policies, for example logging in, editing documents, downloading data, reading customer contact information, entering payables, deleting documents, and the like. Hosted services 120 can be a network service or application, or can be web-based (e.g., accessed via a URL) or native. Examples include software-as-a-service (SaaS) offerings, platform-as-a-service (PaaS) offerings, and infrastructure-as-a-service (IaaS) offerings, as well as internal enterprise applications that are exposed via URLs. Hosted services 120 may include sanctioned services (e.g., those that a company provides for employee use and of which the company's information technology (IT) department is aware) and unsanctioned services (e.g., those a company is not aware of or otherwise are not authorized for use by the company). Hosted services 120 include monitored system 130, monitored system 135, and monitored system 140.

Monitored systems 130, 135, and 140 are example systems, applications, or services hosted by an enterprise for users of endpoints 110. By way of example, monitored system 130 may be a human capital management service, monitored system 135 may be a document storage service, and monitored system 140 may be a customer relationship management service. Hosted services 120 may include additional, fewer, or different monitored systems, as well as any combination or variation of monitored system. Each monitored system of hosted services 120 may be accessible by different groups of users of an enterprise, from human resources employees, to engineers, to finance employees, and to sales employees, among others. In doing so, monitored systems 130, 135, and 140 may provide an interface (e.g., presented via endpoints 110) for users to login, view, interact with, and manage data, and perform respective tasks. Each monitored system may offer different services based on the type or role of the user, and thus, may manage user data to comply with related security policies. Accordingly, each of monitored systems 130, 135, and 140 may store and manage different sets of data for use by the users to carry out various functionality. In various embodiments, monitored systems 130, 135, and 140 operate independently relative to one another, such that each monitored system manages its own users, data, metadata, and the like without insight into another monitored system's users, data, metadata, and the like.

Network security system 125 may provide cloud-hosted network security services to endpoints 110, one or more hosted services 120, or a combination. For example, an enterprise may implement network security system 125 as protection for enterprise endpoints 110 and for data stored and managed by hosted services 120. In particular, network security system 125 analyzes data across all the monitored systems of hosted services 120, as well as interactions with the data by endpoints 110 to perform security analysis and enforce security policies including intrusion detection, threat scanning, data loss prevention (DLP), unauthorized access, anomalous user behavior, and the like.

Network security system 125 may be implemented on or hosted by one or more computing systems (e.g., computing device 1000 as described with respect to FIG. 10) hosting cloud-based services in a datacenter, for example. Network security system 125 includes data collection engine 145, connector engine 150, unified data model 155, user interface 160, and security services 165. The modules of network security system 125 may be implemented in hardware, software, firmware, or a combination and need not be divided up in precisely the same modules as shown in FIG. 1. Some of the modules can also be implemented on different processors or computers or spread among any number of different processors or computers. In addition, in some embodiments, modules may be combined, operated in parallel, or in a different sequence than that shown without affecting the functions achieved and without departing from the spirit of this disclosure. Also, as used herein, the term "module" can include "sub-modules," which themselves can be considered to constitute modules. The term module may be interchanged with component and neither term requires a specific hardware element but rather indicates a device or software that is used to provide the described functionality. The modules (shown as blocks) in network security system 125 may, in some embodiments, also be thought of as flowchart steps in a method. In some embodiments, a software module need not have all its code disposed contiguously in memory (e.g., some parts of the code can be separated from other parts of the code with code from other modules or other functions disposed in between). Network security system 125 may be cloud-based, and an instance of network security system 125 may be instantiated for each enterprise or hosted service using network security system 125 security services. In some embodiments, network security system 125 may provide services for any number of enterprises and hosted services and techniques may be used to identify violations of security policies of each enterprise and hosted service.

Data collection engine 145 may obtain data from monitored systems 130, 135, and 140. Monitored systems 130, 135, and 140 may store various objects, and parameters thereof (e.g., metadata), during user creation and during normal use and operation of the services provided by the monitored systems. Examples of the objects stored and managed by monitored systems 130, 135, and 140 include user accounts, documents, tasks, assets, events, and the like. Examples of the parameters of the objects include user identifiers, user roles, document statuses, document types, document information, company categories, user access control information, user permission indicators, and the like.

By way of an example, a monitored system may store a user's name, email address, and a unique identifier for the user. By way of another example, a monitored system may store a document uploaded by a user, as well as parameters automatically created or manually configured by a user, such as document name, document size, document type, document confidentiality level, access permissions, and the like. Other information stored by monitored systems 130, 135, and 140 may include system configurations, features enabled for the enterprise or specific users, user authentication methods (e.g., multi-factor authentication MFA)), password policies, guest accounts, and the like. Data collection engine 145 collects the data from the monitored systems by APIs.

Connector engine 150 may generate unified data model 155 using the data from each of monitored systems 130, 135, and 140. More specifically, connector engine 150 may collect a set of data from each monitored system, normalize the sets of data (e.g., convert the sets of data into the same format), and organize the sets of data into a data structure (e.g., a table, a graph, e.g., unified data model 155) having a unified format. This data structure is unified data model 155. Connector engine 150 analyzes unified data model 155 to establish connections between monitored systems 130, 135, and 140. For example, connector engine 150 may establish a connection between monitored systems 130 and 135 based on identifying matching parameters of objects in respective data sets, such as a matching email address tied to individual user accounts. Connector engine 150 may indicate discovered connections in unified data model 155, which may be viewed in user interface 160 (e.g., a graphical user interface that can be displayed and interacted with on endpoints 110) and used by security services 165 during the performance of security monitoring and enforcement processes described herein (e.g., method 300 of FIG. 3).

Security services 165 includes functionality for analyzing unified data model 155, and thus data and user actions within hosted services 120, for security issues and enforcing security policies. For example, security services 165 may query unified data model 155 to identify violations of security policies, whether intentional or inadvertent, in one or more of monitored systems 130, 135, and 140. In detecting a violation of a security policy, security services 160 may provide alerts to users and administrators, and/or remediate the violation, such as by updating data at a non-compliant monitored system or blocking access to the monitored system or data thereof. Security services 165 includes security policy query engine 170 and policy monitor and enforcement engine 175.

Security policy query engine 170 may execute queries corresponding to one or more security policies of the enterprise to detect a violation thereof. A security policy query may include a particular monitored system to investigate, an indication of one or more rules to be checked in accordance with a security policy, applicable data, and the like. The security policy query may be selected by a user or administrator via user interface 160. For example, the user or administrator may select from a pre-configured list of security policy queries that cover various enterprise security policies. Additionally, or alternatively, the user or administrator may input a new security policy query by entering or selecting information via one or more navigable dashboards of user interface 160. In some embodiments, security policy query engine 170 may expose data objects or parameters within unified data model 155 in a format that facilitates creation of a new security policy, then converts the input information into a format or language in which unified data model 155 is structured. In this way, the user or administrator might not need to know or understand the language with which to query unified data model 155, creating a simpler process for creating security policy queries. Additional information about user interface 160 and the query creation process is shown and described below with respect to user interface 601 of FIGS. 6, 7, 8, and 9.

Upon receiving a selection of an existing security policy query or submission of a new security policy, security policy query engine 170 executes the query to search unified data model 155 and returns results indicative of a pass or failure of rules of the query, and consequently, a pass or violation of a corresponding security policy. Alternatively, security policy query engine 170 may enqueue a number of queries and execute the queries from a queue (e.g., in a sequential order, e.g., first-in first-out) periodically. For example, security policy query engine 170 may perform the enqueued queries every hour. Security policy query engine 170 may instead, or additionally, perform the enqueued queries upon indication that data in unified data model 155 has changed (e.g., via notification by data collection engine 145 or connector engine 150, or via notification by a monitored system via an API). Other durations or triggers may be contemplated but are not included here for the sake of brevity.

Policy monitor and enforcement engine 175 identifies violations of security policies and performs actions in response to determining violations of security policies. For example, policy monitor and enforcement engine 175 may provide a notification to a user or administrator (e.g., endpoints 110) indicating the violation. Additionally, or alternatively, policy monitor and enforcement engine 175 may update data of a non-compliant monitored system to remediate the violation, such as by correcting erroneous data, updating a flag to prevent access by a suspicious user, or the like. Additional information about network security system 125, hosted services 120, and unified data model 155 is shown and described next in FIG. 2.

Figure 2:
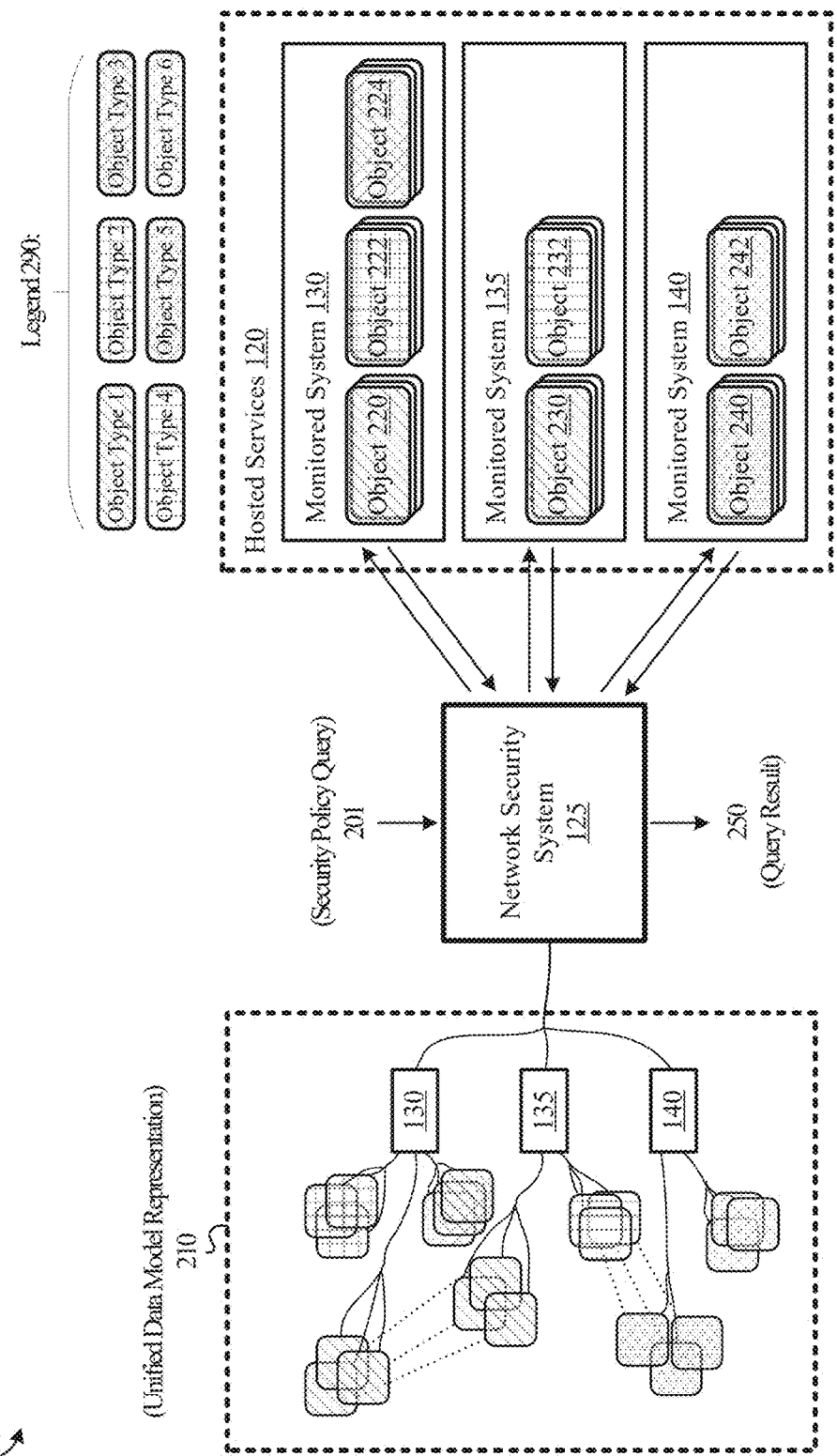
FIG. 2 illustrates additional details of the network security system of FIG. 1, according to some embodiments.

FIG. 2 illustrates operating environment 200, which includes and references elements of system 100 of FIG. 1. Operating environment 200 shows network security system 125, hosted services 120, and unified data model representation 210. Network security system 125 interfaces and communicates with endpoints 110 (not shown in operating environment 200) and with hosted services 120, among other elements, in performing security policy monitoring and enforcement operations, such as method 300 of FIG. 3.

In operating environment 200, hosted services 120 includes monitored system 130, monitored system 135, and monitored system 140, and each of the monitored systems includes a number of objects stored and managed within a respective monitored system. In particular, monitored system 130 includes object 220, object 222, and object 224, monitored system 135 includes object 230 and object 232, and monitored system 140 includes object 240 and object 242.

Each object includes a type, which is illustrated by a pattern in FIG. 2, each pattern corresponding to a type denoted in legend 290. For example, object 220 includes object type 1, object 222 includes object type 2, object 224 includes object type 3, object 230 includes object type 1, object 232 includes object type 4, object 240 includes object type 5, and object 242 includes object type 6. By way of example, object type 1 may correspond to a user account type, object type 2 may correspond to another user account type, object type 3 may correspond to yet another user account type, object type 4 may correspond to document, object type 5 may correspond to a task, and object type 6 may correspond to an asset. It may be appreciated that hosted services 120 may include additional, fewer, or different types of monitored systems, and each monitored system may include additional, fewer, or different types of objects.

Each object also includes one or more parameters. For example, a user account object may include parameters, such as a user account name, a user account creation date, a user account identifier, an email address associated with the user account, a user account role, a company category (e.g., finance, human resources, engineering, sales) associated with the user account, user account permissions, a login key type, an authentication type, and the like, as well as combinations and variations of parameters. A document object may include parameters, such as a document name, a document type, a document size, a last edited date, a last edited by indicator, a sensitivity or confidentiality level, an access permissions indicator, and the like, as well as combinations and variations of parameters. A task object may include parameters, such as a task name, a task type, a task location, a task description, a responsible user account or group, a task creation date, a task completion date, and the like, as well as combinations and variations of parameters. An asset object may include parameters, such as asset name, asset type, asset location, asset owner, and the like, as well as combinations and variations of parameters. As mentioned, other types of objects may be contemplated, each including a combination or variation of parameters based on features, functionality, and context of a given monitored system.

In performing a security monitoring and enforcement process, network security system 125 obtains data from each of monitored systems 130, 135, and 140, including the objects and associated parameters and data thereof (e.g., content of a field/parameter associated with an object, e.g., a name within a user account name parameter of a user account object). For example, network security system 125 communicates with monitored system 130, via an API, to collect objects 220, 222, and 224 and associated parameters, with monitored system 135, via an API, to collect objects 230 and 232 and associated parameters, and with monitored system 140, via an API, to collect objects 240 and 242 and associated parameters. Network security system 125 may obtain such data once, periodically, on-demand (e.g., via request by endpoints 110), or as updates are made to data of a given monitored system (e.g., initiated by the given monitored system via API).

Having obtained data from monitored systems 130, 135, and 140, network security system 125 generates unified data model 155, which is a data model created using normalized and formatted data from each of the monitored systems. Network security system 125 may organize the data from hosted services 120 into a data structure, such as a table or a graph, a representation of which is depicted in FIG. 2 by unified data model representation 210. For example, network security system 125 creates a graph-like representation, such as one illustrated by unified data model representation 210, that shows objects, or groups of objects, their association with a monitored system, and correlations to other objects of one or more other monitored systems.

In various embodiments, network security system 125 determines connections between objects across monitored systems by identifying the parameters of each object of a monitored system and determining matches of parameters of objects. In some such embodiments, network security system 125 establishes a primary connection between two or more objects if the objects are account-related or user-identifying objects (e.g., user account objects), and if parameters of the two or more objects match (e.g., email addresses), thus indicating that the objects correspond to the same person. Network security system 125 may then establish secondary connections between two or more objects, whether the objects are user-identifying or not, if parameters of an object indicate an association with a user account linked by the primary connection. In some embodiments, network security system 125 may establish connections irrespective of the identification of matching user accounts by using other types of objects and parameters.

Network security system 125 can create logical or visual indications of connections in unified data model 210 to depict the connections to a monitored system and to other objects belonging to different monitored system(s). More particularly, in FIG. 2, unified data model representation 210 shows a visual representation of objects 220, 222, and 224 (e.g., denoted by the icons having respective patterns according to legend 290) and a connection between objects 220, 222, and 224 to monitored system 130. Similarly, unified data model representation 210 shows a visual representation of objects 230 and 232 and a connection between objects 230 and 232 to monitored system 130, and a visual representation of objects 240 and 242 and a connection between objects 240 and 242 to monitored system 130. Unified data model 210 also shows a visual representation of a connection between object 220 of monitored system 130 and object 230 of monitored system 135, and a connection between object 232 of monitored system 135 and object 240 of monitored system 140. The connections across monitored systems is shown by the dashed lines in unified data model 210.

By way of example, with respect to the connections between objects across monitored systems, objects 220 and 230 may be user account objects that share a user account identifier parameter, such as an email address. Thus, network security system 125 can determine that objects 220 and 230 are associated with the same user. Consequently, network security system 125 can identify information about the user in both monitored system 130 and monitored system 135 based on the connection, which may be otherwise unattainable by the individual monitored systems without integration between the monitored systems.

By way of another example, also with respect to the connections between objects across monitored systems, object 232 may be a document managed by monitored system 135, and object 240 may be a task created in monitored system 140. Object 232 may include parameters that indicate that the document belongs to the finance group of the enterprise, that the document is of a confidential nature, and that the document is accessible only by user accounts having a finance manager role. Object 240 may include parameters that indicate that the task includes performing an action on the document indicated by object 232. Thus, network security system 125 can determine that objects 232 and 240 are related.

Following the examples described above with respect to the connections indicated in unified data model 155 (and depicted by unified data model representation 210), in operation, network security system 125 receives a security policy query 201 from a user (e.g., endpoints 110) implicating a security policy of the enterprise and various objects and corresponding data of one or more of monitored systems 130, 135, and 140. For example, security policy query 201 may request network security system 125 to identify violations of a rule of a security policy that prohibits unauthorized access to documents managed by monitored system 135. Upon receiving security policy query 201, network security system 125 searches unified data model 155, leveraging the connections, for violations of the security policy. In searching unified data model 155, network security system 125 identifies object 232 as a document subject to the security policy and object 240 as a task related to object 232. Network security system 125 may identify that object 232 is a confidential document accessible only by a finance manager as mentioned in the aforementioned example. Network security system 125 may further identify other information associated with object 240, based on the connection established between object 232 and object 240, which may include an indication that the owner of the task is a non-finance employee who should not have access to object 232. Accordingly, network security system 125 generates query result 250 that indicates a violation of the security policy within monitored system 140. Network security system 125 may take further action, including providing a notification of the violation to the user and/or updating parameters of object 240 to comply with the security policy.

FIG. 3 illustrates a method 300 of analyzing data of monitored systems (e.g., monitored systems 130, 135, and 140) using a network security system (e.g., network security system 125) to identify violations of security policies. Method 300 may include more or fewer steps than those described here, and the described steps may be performed in any order and as many times as needed to monitor data in violation of security policies established by network security system 125. Method 300 may be performed by elements of network security system 125, such as data collection engine 145, connector engine 150, and security policy query engine 170, among other elements. Accordingly, method 300 may be implemented in hardware, software, and/or firmware, as well as combinations thereof. In the description of method 300 below, the steps of method 300 reference elements of system 100 of FIG. 1 and operating environment 200 of FIG. 2.

To begin method 300, in step 305, data collection engine 145 of network security system 125 obtains data from monitored systems 130, 135, and 140. The data includes objects and parameters thereof created and managed by the monitored systems. Examples of the objects stored and managed by monitored systems 130, 135, and 140 include user accounts, documents, tasks, assets, events, and the like. Examples of the parameters of the objects include user identifiers, user roles, document statuses, document types, document information, company categories, user access control information, user permission indicators, and the like. Data collection engine 145 may obtain the data from the monitored systems via APIs.

In step 310, connector engine 150 generates unified data model 155 using the data from each of monitored systems 130, 135, and 140. More specifically, connector engine 150 may collect a set of data from each monitored system, normalize the sets of data (e.g., convert the sets of data into the same format), and organize the sets of data into a data structure (e.g., a table, a graph, e.g., unified data model 155) having a unified format, an example of which is shown by unified data model representation 210. Also in step 310, connector engine 150 analyzes unified data model 155 to establish connections between monitored systems 130, 135, and 140. For example, connector engine 150 may establish a connection between monitored systems 130 and 135 based on identifying matching parameters of objects in respective data sets, such as a matching email address tied to individual user accounts.

In step 315, security policy query engine 170 of security services 165 executes a security policy query, corresponding to one or more security policies of the enterprise, to detect a violation of the security policy. A security policy query may include a particular monitored system to investigate, an indication of one or more rules to be checked in accordance with a security policy, applicable data, and the like. Upon receiving a selection of an existing security policy query or submission of a new security policy, security policy query engine 170 executes the query to search unified data model 155 and returns results indicative of a pass or failure of rules of the query, and consequently, a pass or violation of a corresponding security policy.

In step 320, policy monitor and enforcement engine 175 of security services 165 identifies violations of security policies and performs actions in response to determining violations of security policies. For example, policy monitor violations of security policies. For example, policy monitor and enforcement engine 175 may provide a notification to a user or administrator (e.g., endpoints 110) indicating the violation. Additionally, or alternatively, policy monitor and enforcement engine 175 may update data of a non-compliant monitored system to remediate the violation, such as by correcting erroneous data, updating a flag to prevent access by a suspicious user, or the like.

Figure 4:
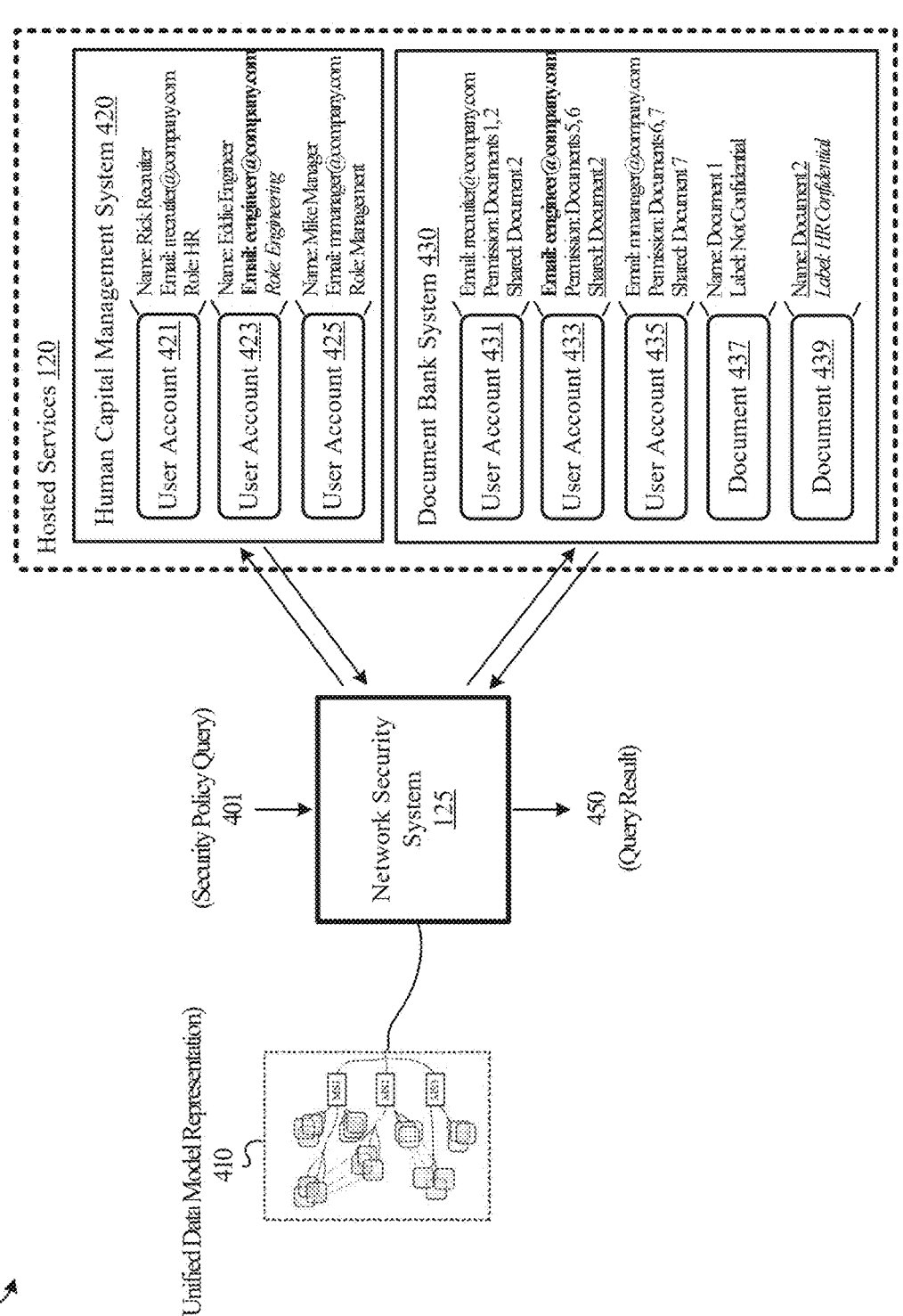
FIG. 4 illustrates an operational scenario depicting example elements of a network security system in performing a security policy query, according to some embodiments.

FIG. 4 illustrates operating environment 400, which includes and references elements of system 100 of FIG. 1. Operating environment 400 shows network security system 125, hosted services 120, and unified data model representation 410, an example of unified data model representation 210 of operating environment 200 of FIG. 2. Network security system 125 interfaces and communicates with endpoints 110 (not shown in operating environment 400) and with hosted services 120, among other elements, in performing security policy monitoring and enforcement operations, such as method 300 of FIG. 3.

In operating environment 400, hosted services 120 includes human capital management system 420 and document bank system 430, both of which are examples of monitored systems 130, 135, and 140. Human capital management system 420 and document bank system 430 each include a number of objects stored and managed within a respective system. In particular, human capital management system 420 includes user account 421, user account 423, and user account 425, while document bank system 430 includes user account 431, user account 433, user account 435, document 437, and document 439. It may be appreciated that hosted services 120 may include additional, fewer, or different types of monitored systems, and each system may include additional, fewer, or different types of objects.

Each object of human capital management system 420 and document bank system 430 also includes one or more parameters. For example, user accounts 421, 423, and 425 of human capital management system 420 include a name, an email address, and a role associated with a given user account. User account objects of document bank system 430 may include similar or different parameters. In particular, user accounts 431, 433, and 435 of document bank system 430 include an email address, a permissions indication (e.g., with respect to document access), and a shared document indication (e.g., an indication of documents shared with or by a given user account). Documents 437 and 439 of document bank system 430 include a document name and a document label with respect to sensitivity and confidentiality.

In performing a security monitoring and enforcement process, network security system 125 obtains data from human capital management system 420 and document bank system 430, including the objects and associated parameters and data thereof (e.g., content of a field/parameter associated with an object, e.g., a name within a user account name parameter of a user account object). For example, network security system 125 communicates with human capital management system 420, via an API, to collect user accounts 421, 423, and 425 and associated parameters. Additionally, network security system 125 communicates with document bank system 430, via an API, to collect user accounts 431, 433, and 435, and documents 437 and 439 and associated parameters.

Upon obtaining data from human capital management system 420 and document bank system 430, network security system 125 generates unified data model 155, which is a data model created using normalized and formatted data from each of the monitored systems. Network security system 125 may organize the data from hosted services 120 into a data structure, such as a table or a graph, a representation of which is depicted in FIG. 4 by unified data model representation 410. For example, network security system 125 creates a graph-like representation, such as one illustrated by unified data model representation 410, that shows objects, or groups of objects, their association with a monitored system, and correlations to other objects of one or more other monitored systems.

In various embodiments, network security system 125 determines connections between objects across monitored systems by identifying the parameters of each object of a monitored system and determining matches of parameters of objects. In some such embodiments, network security system 125 establishes a primary connection between two or more objects if the objects are account-related or user-identifying objects (e.g., user account objects), and if parameters of the two or more objects match (e.g., email addresses), thus indicating that the objects correspond to the same person. Network security system 125 may then establish secondary connections between two or more objects, whether the objects are user-identifying or not, if parameters of an object indicate an association with a user account linked by the primary connection. In some embodiments, network security system 125 may establish connections irrespective of the identification of matching user accounts by using other types of objects and parameters.

Network security system 125 can create logical or visual indications of connections in unified data model 410 to depict the connections to a monitored system and to other objects belonging to different monitored system(s). While not explicitly shown in unified data model 410, some example connections are depicted by emphasized text (e.g., bolded, underlined, italicized) within human capital management system 420 and document bank system 430. For example, network security system 125 may identify a first connection between user account 423 of human capital management system 420 and user account 433 of document bank system 430 based on parameters of respective user accounts. More specifically, network security system 125 determines that the email address parameter of user account 423 matches the email address parameter of user account 433, indicating that the user accounts belong to the same person. This connection is denoted by the bold text in FIG. 4. Network security system 125 may identify a second connection between user account 433 and document 439 within document bank system 430 as user account 433 has been shared "document 2" corresponding to the name of document 439. This second connection is denoted by the underlined text in FIG. 4.

In an example operational scenario, network security system 125 receives a security policy query 401 from a user (e.g., endpoints 110) implicating a security policy of the enterprise and various objects and corresponding data of hosted services 120. For example, security policy query 401 may request network security system 125 to identify violations of a rule of a security policy that prohibits unauthorized access to documents managed by document bank system 430. Upon receiving security policy query 401, network security system 125 searches unified data model 155, leveraging the connections, for violations of the security policy. In searching unified data model 155, network security system 125 identifies documents 437 and 439 and determines whether unauthorized users can access or have accessed the documents. Network security system 125 determines that document 437 is not confidential and thus does not apply to security policy query 401. However, network security system 125 determines that document 439 is labeled as HR confidential, and thus, is subject to security policy query 401. Network security system 125 uses the first and second connections described above to identify additional information about the user(s) having access to document 439. In document bank system 430, user account 433 has been shared document 439, and thus, user account 433 has access to document 439. Document bank system 430 does not, however, have insight into the role of user account 433 indicated in human capital management system 420. Thus, by leveraging the connections, network security system 125 can identify that user account 423, linked to user account 433, has an engineering role. Accordingly, network security system 125 identifies a violation of the security policy as the role of the user of user account 433 does not match the confidentiality label of document 439. The connection to the violation of the security policy is denoted by the italicized text in FIG. 4. As a result of identifying the violation of the security policy, network security system 125 generates query result 450 that indicates the violation of the security policy within document bank system 430. Network security system 125 may take further action, including providing a notification of the violation to the user and/or updating parameters of user account 433 (e.g., removing or blocking access to document 439) to comply with the security policy.

Figure 5:
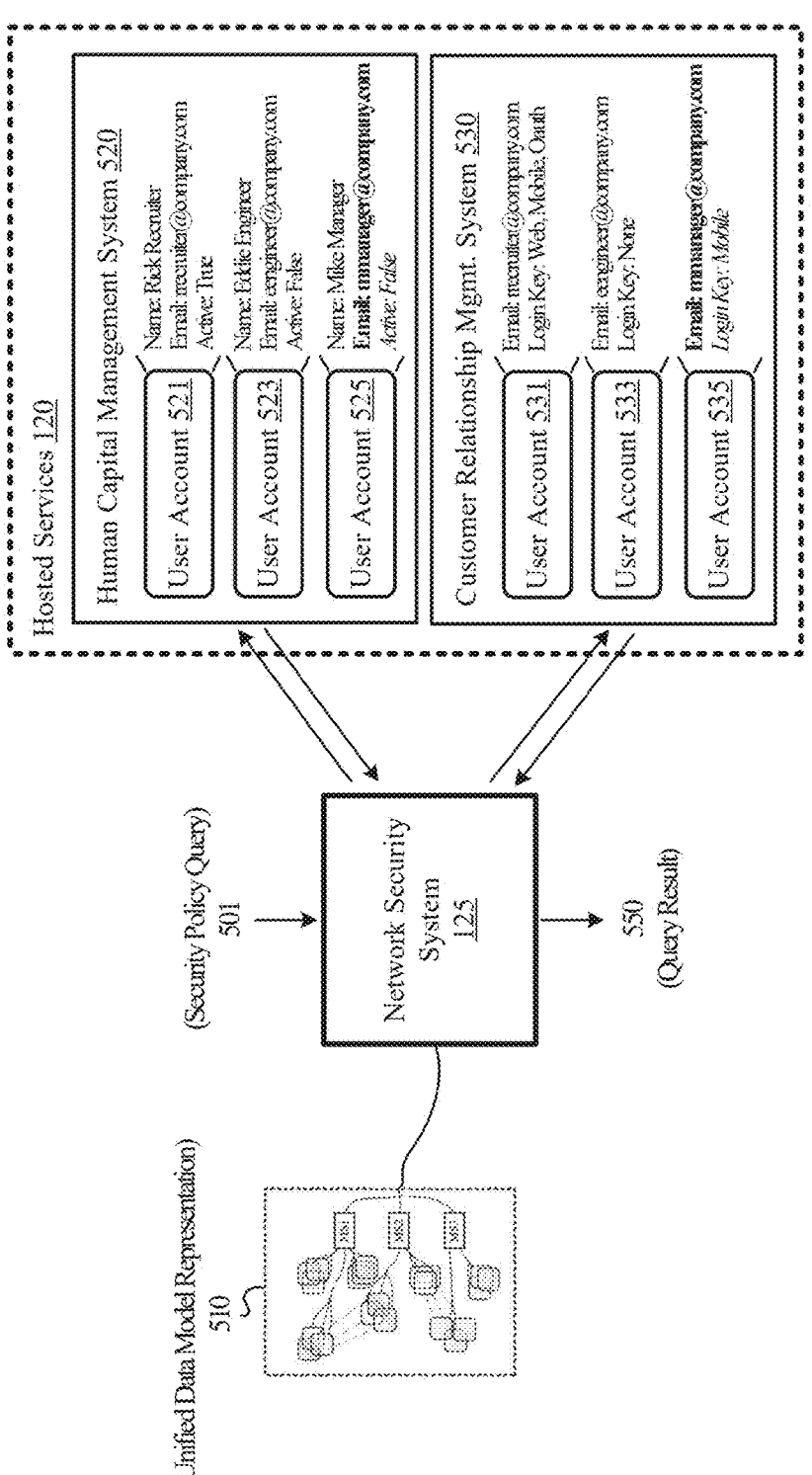
FIG. 5 illustrates an operational scenario depicting example elements of a network security system in performing a security policy query, according to some embodiments.

FIG. 5 illustrates operating environment 500, which includes and references elements of system 100 of FIG. 1. Operating environment 500 shows network security system 125, hosted services 120, and unified data model representation 510, an example of unified data model representation 210 of operating environment 200 of FIG. 2. Network security system 125 interfaces and communicates with endpoints 110 (not shown in operating environment 500) and with hosted services 120, among other elements, in performing security policy monitoring and enforcement operations, such as method 300 of FIG. 3.

In operating environment 500, hosted services 120 includes human capital management system 520 and customer relationship management system 530, both of which are examples of monitored systems 130, 135, and 140. Human capital management system 520 and customer relationship management system 530 each include a number of objects stored and managed within a respective system. In particular, human capital management system 520 includes user account 521, user account 523, and user account 525, while customer relationship management system 530 includes user account 531, user account 533, and user account 535. It may be appreciated that hosted services 120 may include additional, fewer, or different types of monitored systems, and each system may include additional, fewer, or different types of objects.

Each object of human capital management system 520 and customer relationship management system 530 also includes one or more parameters. For example, user accounts 521, 523, and 525 of human capital management system 520 include a name, an email address, and an employment status associated with a given user account. User account objects of customer relationship management system 530 may include similar or different parameters. In particular, user accounts 531, 533, and 535 of customer relationship management system 530 include an email address and an indication of a valid login key to access customer relationship management system 530.

In performing a security monitoring and enforcement process, network security system 125 obtains data from human capital management system 520 and customer relationship management system 530, including the objects and associated parameters and data thereof (e.g., content of a field/parameter associated with an object, e.g., a name within a user account name parameter of a user account object). For example, network security system 125 communicates with human capital management system 520, via an API, to collect user accounts 521, 523, and 525 and associated parameters. Additionally, network security system 125 communicates with customer relationship management system 530, via an API, to collect user accounts 531, 533, and 535 and associated parameters.

Upon obtaining data from human capital management system 520 and customer relationship management system 530, network security system 125 generates unified data model 155, which is a data model created using normalized and formatted data from each of the monitored systems. Network security system 125 may organize the data from hosted services 120 into a data structure, such as a table or a graph, a representation of which is depicted in FIG. 5 by unified data model representation 510. For example, network security system 125 creates a graph-like representation, such as one illustrated by unified data model representation 510, that shows objects, or groups of objects, their association with a monitored system, and correlations to other objects of one or more other monitored systems.

In various embodiments, network security system 125 determines connections between objects across monitored systems by identifying the parameters of each object of a monitored system and determining matches of parameters of objects. In some such embodiments, network security system 125 establishes a primary connection between two or more objects if the objects are account-related or user-identifying objects (e.g., user account objects), and if parameters of the two or more objects match (e.g., email addresses), thus indicating that the objects correspond to the same person. Network security system 125 may then establish secondary connections between two or more objects, whether the objects are user-identifying or not, if parameters of an object indicate an association with a user account linked by the primary connection. In some embodiments, network security system 125 may establish connections irrespective of the identification of matching user accounts by using other types of objects and parameters.

Network security system 125 can create logical or visual indications of connections in unified data model 510 to depict the connections to a monitored system and to other objects belonging to different monitored system(s). While not explicitly shown in unified data model 510, some example connections are depicted by emphasized text (e.g., bolded, underlined, italicized) within human capital management system 520 and customer relationship management system 530. For example, network security system 125 may identify a first connection between user account 525 of human capital management system 520 and user account 535 of customer relationship management system 530 based on parameters of respective user accounts. More specifically, network security system 125 determines that the email address parameter of user account 525 matches the email address parameter of user account 535, indicating that the user accounts belong to the same person. This connection is denoted by the bold text in FIG. 5.

In an example operational scenario, network security system 125 receives a security policy query 501 from a user (e.g., endpoints 110) implicating a security policy of the enterprise and various objects and corresponding data of hosted services 120. For example, security policy query 501 may request network security system 125 to identify violations of a rule of a security policy that prohibits access to hosted services 120 without a valid login key. Upon receiving security policy query 501, network security system 125 searches unified data model 155, leveraging the connections, for violations of the security policy. In searching unified data model 155, network security system 125 identifies that user account 525, among other user accounts, has an employment status indicating terminated (e.g., an active employment status flag that indicates false) and determines whether a user associated with user account 525 has access to any other monitored systems. Network security system 125 determines that user account 535, associated with user account 525 based on the connection in unified data model representation 510, has an available login method to access customer relationship management system 530 despite the user being terminated. Accordingly, network security system 125 identifies a violation of the security policy. The connection to the violation of the security policy is denoted by the italicized text in FIG. 5. As a result of identifying the violation of the security policy, network security system 125 generates query result 550 that indicates the violation of the security policy within customer relationship management system 530. Network security system 125 may take further action, including providing a notification of the violation to the user and/or updating parameters of user account 535 (e.g., removing or blocking access to customer relationship management system 530) to comply with the security policy.

FIGS. 6, 7, 8, and 9 each illustrate an example user interface of a network security system, according to some embodiments. FIGS. 6, 7, 8, and 9 show user interface (UI) 601, which may be an example of user interface 160 of network security system 125 of system 100 of FIG. 1.

In various embodiments, UI 601 includes one or more navigable dashboards that include and display textual, graphical, numerical, and other visual representations of information related to an enterprise system (e.g., one or more of hosted services 120) and security policies associated with an enterprise and its monitored systems. The navigable dashboards may include icons, windows, tool bars, selector items (e.g., drop-down menus, radio buttons), text fields, and other indicators that may be interacted with by a user of endpoints 110 in the operation of functionality of an enterprise system and/or in the performance of a security policy monitoring and enforcement process, such as ones described above. Upon interacting with an element of UI 601, a user may be able to input information, select information, modify information, save information, submit information, and/or navigate to another dashboard instantiated by a network security system on UI 601.

Referring first to FIG. 6, UI 601 includes security policy rule creation dashboard 610, which is representative of a dashboard in which a user defines and saves rules applicable in security policy queries (e.g., security policy query 201, security policy query 401, security policy query 501) for use in a security policy monitoring and enforcement process (e.g., method 300 of FIG. 3). Security policy rule creation dashboard 610 includes various fields in which a user may input information defining a security policy rule, such as a rule name, a severity (e.g., low, medium, high, critical), a rule description, a rule definition, a remediation guide, a rule category, and the like.

In the example shown in FIG. 6, security policy rule creation dashboard 610 shows a rule related to authorized login of monitored systems of an enterprise, such as one or more of monitored systems 130, 135, and 140 of FIG. 1, human capital management system 420 and document bank system 430 of FIG. 4, and human capital management system 520 and customer relationship management system 530 of FIG. 5. In particular, as indicated in the rule description window in UI 601, the rule specifies that user accounts disabled in one monitored system (e.g., Azure Active Directory) should also be disabled in another monitored system (e.g., Salesforce).

In creating the rule, a user enters a definition for the rule using a governance language in accordance with a format of a unified data model created by the network security system (e.g., unified data model 155). The user may input, with the facilitation of a query generation engine of the network security system that exposes language shortcuts such that the end user need not know a query language native to the network security system, objects and parameters to be monitored, as well as rules to be applied, that can be executed by the network security system as opposed to custom generated scripts engineered by an administrator or software engineer. In some embodiments, the keywords entered by the user in the rule definition window may be automatically formatted, translated, or populated into different words in accordance with a language or format used by the unified data model. For example, a user may enter "search user account in Azure for email address," and the network security system may translate, or auto-populate, some of the words, like "user account," to formatted keywords, like "Object-User Account," which may be usable by the network security system in carrying out a query with this rule.

The user may also enter remediation guidance that can be performed manually by an administrator or support agent. Additionally, or alternatively, the steps detailed in the remediation guidance window may be ingested by the network security system, processed and converted into actionable steps performable by the network security system without manual effort of a user, and saved for use upon execution of a security policy query that includes this rule.

Upon completion of the fields in security policy rule creation dashboard 610, a user may save the rule by clicking or interacting with an element on UI 601. In response to saving the rule, the network security system reads the information and stores the rule in a rule database for future use. The network security system may obtain the rule from the rule database upon execution of a security policy query that includes the rule. An example dashboard illustrating the creation of a security policy query is shown and described next with respect to FIG. 7.

In FIG. 7, UI 601 includes security policy query creation dashboard 710, which is representative of a dashboard in which a user defines and saves configurations for a security policy query (e.g., security policy query 201, security policy query 401, security policy query 501) for use in a security policy monitoring and enforcement process (e.g., method 300 of FIG. 3). Security policy query creation dashboard 710 includes various fields in which a user may input information defining a security policy query, such as target monitored system(s) and instances thereof, rule(s) to be applied, action(s) to be taken upon identification of a violation of the rule(s) applied, a security policy query name, a security policy query description, a security policy query status (e.g., enabled, disabled), and the like.

In the example shown in FIG. 7, security policy query creation dashboard 710 shows a security policy query related to authorized login of monitored systems of an enterprise, such as one or more of monitored systems 130, 135, and 140 of FIG. 1, human capital management system 420 and document bank system 430 of FIG. 4, and human capital management system 520 and customer relationship management system 530 of FIG. 5. In particular, as indicated in security policy query creation dashboard 710, the security policy query includes an application of the rule created and shown in security policy rule creation dashboard 610 of FIG. 6. Accordingly, an execution of the security policy query directs the network security system to search a unified data model (e.g., unified data model 155) for data managed by a first monitored system (e.g., Salesforce) and data managed by a second monitored system (e.g., Azure Active Directory), and determine whether any disabled user accounts in the second monitored system have available login methods or are flagged as enabled in the first monitored system. If the network security system finds any such user accounts, the security policy query indicates that the network security system is to send an alert to an IT administrator.

Upon completion of the fields in security policy query creation dashboard 710, a user may save the security policy query by clicking or interacting with an element on UI 601. In response to saving the security policy query and marking the security policy as enabled, the network security system reads the information and stores the security policy query in a query queue for immediate or future use. The network security system may execute the security policy queries in the query queue upon entry, upon request, or periodically, as well as combinations or variations thereof. An example dashboard illustrating findings of executed security policy queries is shown and described next with respect to FIG. 8.

Figure 8:
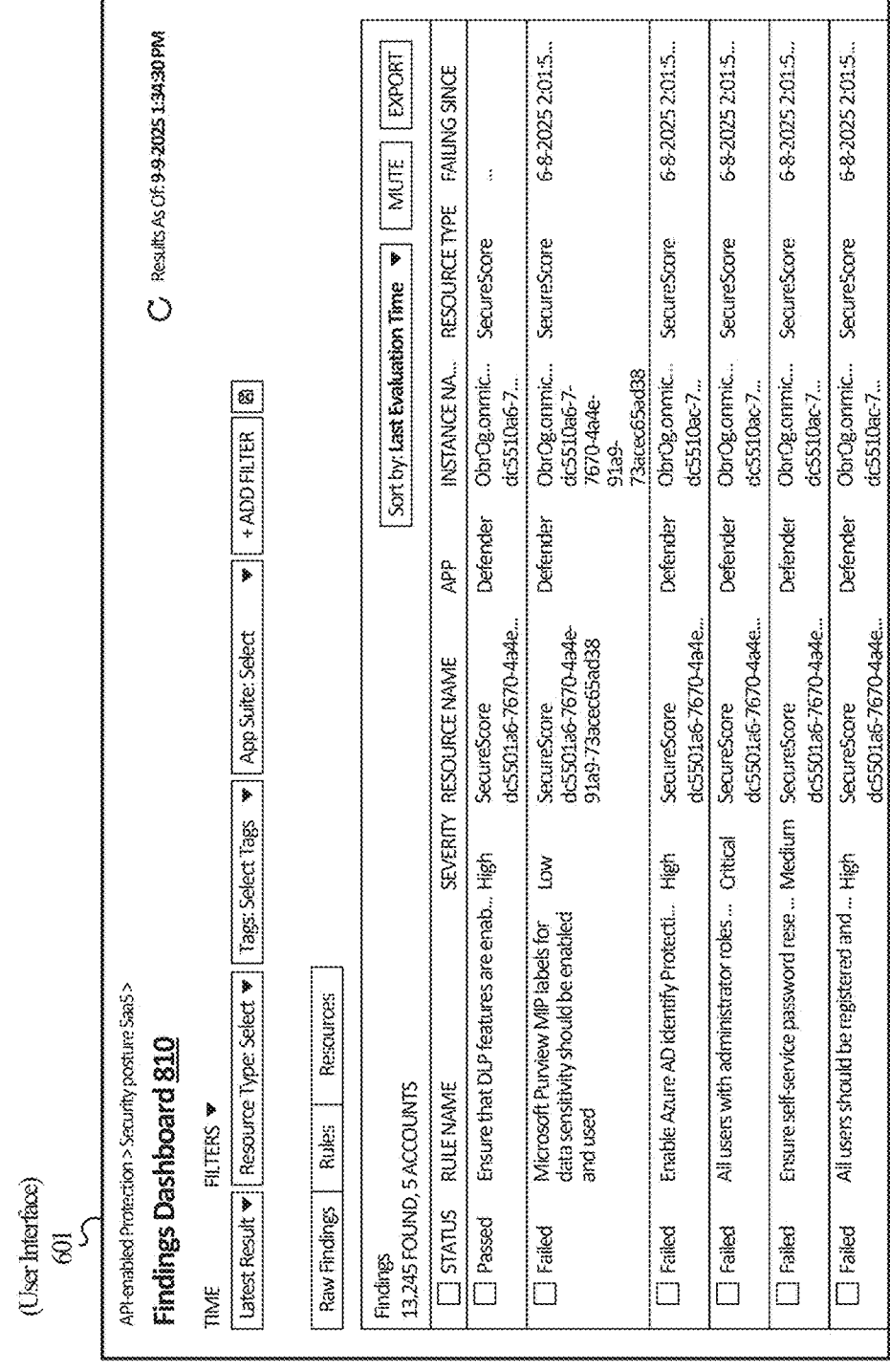
FIG. 8 illustrates an example user interface of a network security system, according to some embodiments.

In FIG. 8, UI 601 includes findings dashboard 810, which is representative of a dashboard in which a user views and interacts with results of executed security policy queries (e.g., security policy query 201, security policy query 401, security policy query 501) during a security policy monitoring and enforcement process (e.g., method 300 of FIG. 3). Findings dashboard 810 includes various elements by which a user can select one or more results of security policy queries for further investigation, filter and sort the results, refresh the results (e.g., initiate a further execution of one or more security policy queries by the network security system), export the results, and the like. Findings dashboard 810 also displays information about the results, such as a status, a query name, a rule name, a severity, a resource name, an application (e.g., a monitored system), an instance of the application, a resource type, a date of execution, pass or fail, and the like. An example dashboard illustrating a detailed view of findings of an executed security policy query is shown and described next with respect to FIG. 9.

In FIG. 9, UI 601 includes detailed findings dashboard 910, which is representative of a dashboard in which a user views detailed results of an executed security policy query (e.g., security policy query 201, security policy query 401, security policy query 501) during a security policy monitoring and enforcement process (e.g., method 300 of FIG. 3). Detailed findings dashboard 910 includes various information that indicates an object or resource name and type, a monitored system name, instances of the monitored system(s) investigated, a number of rules applied in the security policy query, a number of rules passed, a number of rules failed, suggested remediation actions based on the results of the security policy query, and data and/or metadata that caused the failure of the rule(s). Other dashboards and information may also be contemplated to assist a user in identifying and evaluating security concerns for an enterprise.

Figure 10:
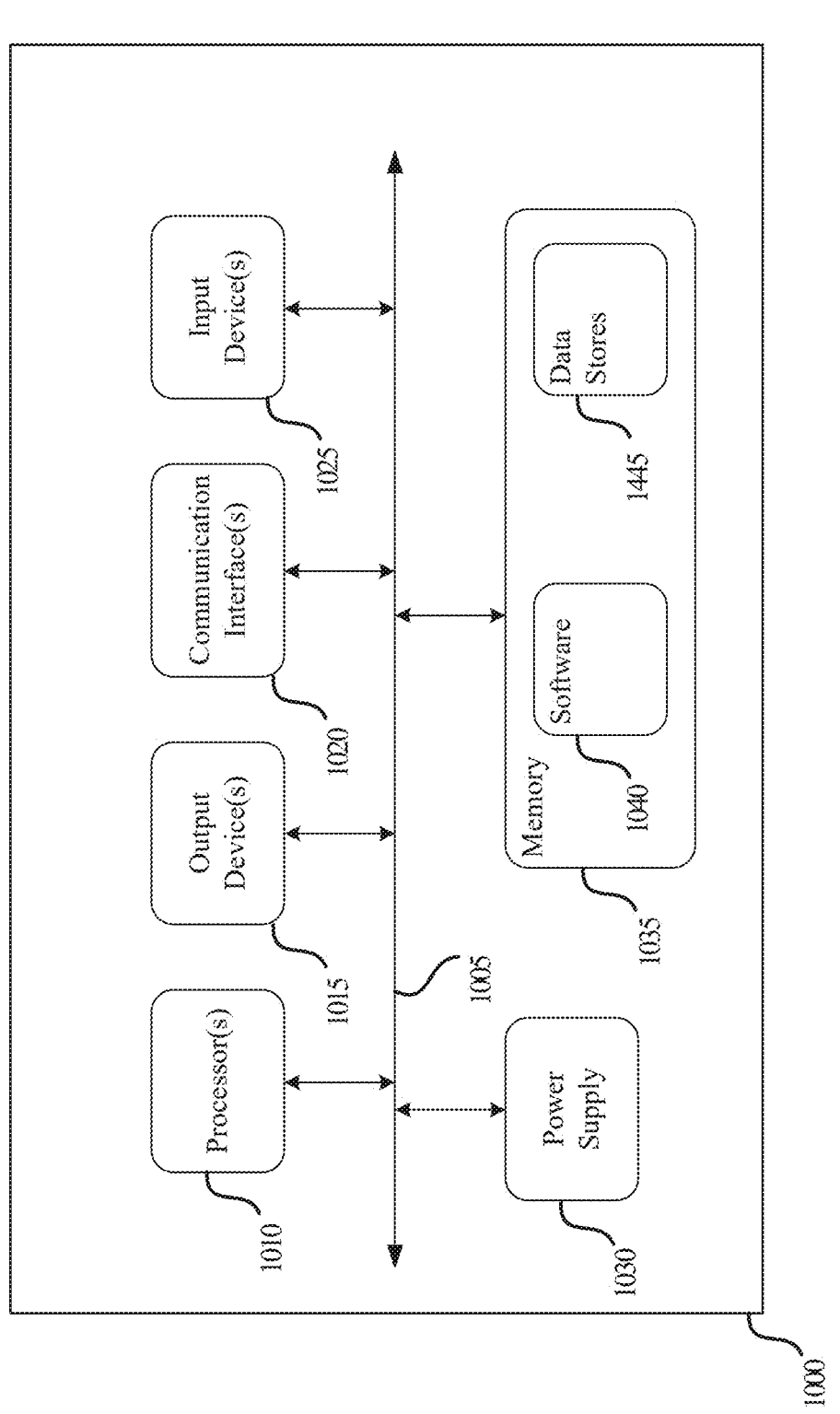
FIG. 10 illustrates an exemplary computing system, according to some embodiments.

FIG. 10 illustrates a computing device 1000, which is representative of any system or collection of systems in which the various applications, processes, services, and scenarios disclosed herein may be implemented. Examples of computing system 1000 include, but are not limited to server computers, web servers, cloud computing platforms, and data center equipment, microcontrollers, micro-controller units (MCUs), as well as any other type of physical or virtual server machine, container, and any variation or combination thereof. In some examples, computing system 1000 may additionally or alternatively be representative of desktop and laptop computers, tablet computers, smart computing devices, and the like. Computing device 1000 includes various components not included for ease of description in other computing devices discussed herein including, for example, endpoints 110, network security system 125, and hosted services 120. Accordingly, computing device 1000 may be an example of endpoints 110, network security system 125, or hosted services 120 by incorporating the functionality described in each.

Computing device 1000 is suitable for implementing processing operations described herein related to enterprise security policy monitoring and enforcement, with which aspects of the present disclosure may be practiced. Computing device 1000 may be configured to implement processing operations of any component described herein including the user system components (e.g., endpoints 110 of FIG. 1) and the cloud-hosted network security services (e.g., network security system 125. As such, computing device 1000 may be configured as a specific purpose computing device that executes specific processing operations to solve the technical problems described herein including those pertaining to security monitoring and enforcement across enterprise monitored systems.

Computing device 1000 may be implemented as a single apparatus, system, or device or may be implemented in a distributed manner as multiple apparatuses, systems, or devices. For example, computing device 1000 may comprise one or more computing devices that execute processing for applications and/or services over a distributed network to enable execution of processing operations described herein over one or more applications or services. Computing device 1000 may comprise a collection of devices executing processing for front-end applications/services, back-end applications/services, or a combination thereof. Computing device 1000 includes, but is not limited to, a bus 1005 communicably coupling processors 1010, output devices 1015, communication interfaces 1020, input devices 1025, power supply 1030, and memory 1035.

Processors 1010 may include general processors, specialized processors such as graphical processing units (GPUs) and digital signal processors (DSPs), or a combination. Processors 1010 may load and execute software 1040 from memory 1035. Software 1040 may include one or more software components such as an endpoint routing client, security services 165 and its incorporated elements (e.g., security policy query engine 170, policy monitor and enforcement engine 175), data collection engine 145, connector engine 150, and user interface 160 and its incorporated elements, or any combination including other software components. In some examples, computing device 1000 may be connected to other computing devices (e.g., display device, audio devices, servers, mobile/remote devices, VR devices, AR devices) to further enable processing operations to be executed. When executed by processors 1010, software 1040 directs processors 1010 to operate as described herein for at least the various processes, operational scenarios, and sequences discussed in the foregoing implementations. Computing device 1000 may optionally include additional devices, features, or functionality not discussed for purposes of brevity. For example, software 1040 may include an operating system that is executed on computing device 1000. Computing device 1000 may further be utilized as endpoints 110 or any of the cloud computing systems in system 100 (FIG. 1) including network security system 125 or cloud computing systems in system 400 (FIG. 4) and system 500 (FIG. 5), any of which may execute method 300 of FIG. 3, among other processes and operations described herein.

Processors 1010 may be implemented within a single processing device but may also be distributed across multiple processing devices or sub-systems that cooperate in executing program instructions. Other non-limiting examples of processors 1010 include general purpose central processing units, microprocessors, graphical processing units, application specific processors, sound cards, speakers and logic devices, gaming devices, VR devices, AR devices as well as any other type of processing devices, combinations, or variations thereof.

Memory 1035 may include any computer-readable storage device readable by processors 1010 and capable of storing software 1040 and data stores 1045. Data stores 1045 may include unified data models, such as unified data model 155, and similar data models represented by unified data model representations 210, 410, and 510, for example. Memory 1035 may include volatile and nonvolatile, removable and non-removable media implemented in any method or technology for storage of information, such as computer readable instructions, data structures, program modules, cache memory, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer-readable storage device a propagated signal.

In addition to computer-readable storage devices, in some implementations, memory 1035 may also include computer-readable communication media over which at least some of software 1040 may be communicated internally or externally. Memory 1035 may be implemented as a single storage device but may also be implemented across multiple storage devices or sub-systems co-located or distributed relative to each other. Memory 1035 may include additional elements, such as a controller, capable of communicating with processors 1010 or possibly other systems.

Software 1040 may be implemented in program instructions and among other functions may, when executed by processors 1010, direct processors 1010 to operate as described with respect to the various operational scenarios, sequences, and processes illustrated herein. For example, software 1040 may include program instructions for executing security policy monitoring, security policy enforcement, security policy remediation, and unified data model generation and connection creation, or the like as described herein.

In particular, the program instructions may include various components or modules that cooperate or otherwise interact to conduct the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1040 may include additional processes, programs, or components, such as operating system software, virtual machine software, or other application software. Software 1040 may also include firmware or some other form of machine-readable processing instructions executable by processors 1010.

In general, software 1040 may, when loaded into processors 1010 and executed, transform a suitable apparatus, system, or device (of which computing device 1000 is representative) overall from a general-purpose computing system into a special-purpose computing system customized to execute specific processing components described herein as well as process data and respond to queries. Indeed, encoding software 1040 on memory 1035 may transform the physical structure of memory 1035. The specific transformation of the physical structure may depend on numerous factors in different implementations of this description. Examples of such factors may include, but are not limited to, the technology used to implement the storage media of memory 1035 and whether the computer-storage media are characterized as primary or secondary storage, as well as other factors.

For example, if the computer readable storage device is implemented as semiconductor-based memory, software 1040 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interfaces 1020 may include communication connections and devices that allow for communication with other computing systems (not shown) over communication networks (not shown in FIG. 10), for example public network 105. Communication interfaces 1020 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication interfaces 1020 may also include associated user interface software executable by processors 1010 in support of the various user input and output devices discussed below. Separately or in conjunction with each other and other hardware and software elements, the user interface software and user interface devices may support a graphical user interface, a natural user interface, or any other type of user interface, for example, that enables front-end processing and including rendering of user interfaces, such as a user interface that is used by a user on endpoint 110. Exemplary applications/services may further be configured to interface with processing components of computing device 1000 that enable output of other types of signals (e.g., audio output, handwritten input) in conjunction with operation of exemplary applications/services (e.g., a collaborative communication application/service, electronic meeting application/service) described herein.

Input devices 1025 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices 1015 may include a display, speakers, haptic devices, and the like. In some cases, the input and output devices may be combined in a single device, such as a display capable of displaying images and receiving touch gestures. The aforementioned user input and output devices are well known in the art and need not be discussed at length here.

Communication between computing device 1000 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6), the transfer control protocol (TCP), and the user datagram protocol (UDP), as well as any other suitable communication protocol, variation, or combination thereof.

The computing device 1000 has a power supply 1030, which may be implemented as one or more batteries. The power supply 1030 may further include an external power source, such as an AC adapter or a powered docking cradle that supplements or recharges the batteries. In some embodiments, the power supply 1030 may not include batteries and the power source may be an external power source such as an AC adapter.

The aforementioned discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

To reduce the number of claims, certain aspects of the technology are presented below in certain claim forms, but the applicant contemplates the various aspects of the technology in any number of claim forms. Any claims intended to be treated under 35 U.S.C. § 112(f) may begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

EXAMPLES

The following illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this Specification. As used below, any reference to a series of examples is to be understood as a reference to each of those examples disjunctively (e.g., "Examples 1-4" is to be understood as "Examples 1, 2, 3, or 4").

Example 1 is a computer-implemented method including obtaining, by a network security system (NSS), first data from a first monitored system associated with an enterprise, obtaining, by the NSS, second data from a second monitored system associated with the enterprise, obtaining, by the NSS, second data from a second monitored system associated with the enterprise, generating, by the NSS, a unified data model using the first data and the second data, wherein generating the unified data model includes identifying a first parameter of a first object in the first data and a first parameter of a second object in the second data based at least in part on the first parameters of the first and second objects matching, and establishing a connection between the first object and the second object based on the identification, and identifying, by the NSS, a violation of a security policy of the enterprise based on searching the unified data model, wherein the searching comprises leveraging the connection and a second parameter of the first object to find corresponding information in the second data in violation of the security policy.

Example 2 is the computer-implemented method of any previous or subsequent example, the method further including responsive to identifying the violation of the security policy, updating, by the NSS, the corresponding information in the second data of the second monitored system to remediate the violation of the security policy.

Example 3 is the computer-implemented method of any previous or subsequent example, wherein the first parameters of the first and second objects include a user identifier associated with a user account of the first and second monitored systems; the second parameter of the first object includes a role associated with the user account; and the corresponding information in the second data includes an access parameter of a document indicating authorized access to the document by user accounts having a different role than the role associated with the user account, and an indication of access of the document by the user account in violation of the security policy.

Example 4 is the computer-implemented method of any previous or subsequent example, wherein the first parameters of the first and second objects include a user identifier associated with a user account of the first and second monitored systems; the second parameter of the first object includes a terminated employment status associated with the user account; and the corresponding information in the second data includes a valid login key parameter indicating authorized access to the second monitored system by user accounts having an active employment status, and an indication of a valid login key parameter associated with the user account in violation of the security policy.

Example 5 is the computer-implemented method of any previous or subsequent example, further including obtaining, by the NSS, third data from a third monitored system associated with the enterprise; and updating, by the NSS, the unified data model using the third data, wherein updating the unified data model includes: identifying a first parameter of a third object in the third data and the first parameter of the second object in the second data based at least in part on the first parameters of the second and third objects matching, establishing a connection between the second object and the third object based on the identification, and establishing a connection between the first object and the third object based on the connection between the second object and the third object.

Example 6 is the computer-implemented method of any previous or subsequent example, wherein searching the unified data model comprises searching, by the NSS, the unified data model responsive to identifying a change in one or more of the first data and the second data.

Example 7 is the computer-implemented method of any previous or subsequent example, wherein searching the unified data model includes searching, by the NSS, the unified data model responsive to receiving, via a user interface of the NSS, a security policy query that includes indications of the security policy with respect to objects and parameters of the first data and objects and parameters of the second data, and wherein the method further includes displaying, by the NSS, an indication of the violation of the security policy on the user interface.

Example 8 is the computer-implemented method of any previous or subsequent example, wherein receiving the security policy query via the user interface of the NSS includes, by the NSS: exposing the objects and the parameters of the first and second data in a first code language; receiving the indications of the security policy in accordance with the first code language; and converting the indications from the first code language to a second code language native to the unified data model and with which to search the unified data model, facilitating generation of the security policy query.

Example 9 is the computer-implemented method of any previous or subsequent example, wherein searching the unified data model includes, by the NSS: receiving, via a user interface of the NSS, a security policy query that includes indications of the security policy with respect to objects and parameters of the first data and objects and parameters of the second data; enqueuing the security policy query in a queue; and searching the unified data model based on the enqueued security policy query on a periodic basis Example 10 is the computer-implemented method of any previous or subsequent example, wherein: the first and second objects includes one of: a user account, a document, a task, an asset, and an event; and the first and second parameters includes one of: a user identifier, a role, a user status, a document status, a document type, a company category, and a permissions indicator.

Example 11 is the computer-implemented method of any previous or subsequent example, the method further including responsive to identifying the violation of the security policy, outputting, by the NSS, a notification of the violation of the security policy.

Example 12 is a computing apparatus including one or more computer-readable storage media; and program instructions stored on the one or more computer-readable storage media executable by a processing device that, based on being read and executed by the processing device, direct the processing device to: obtain first data from a first monitored system associated with an enterprise; obtain second data from a second monitored system associated with the enterprise; generate a unified data model using the first data and the second data, wherein to generate the unified data model, the program instructions direct the processing device to: identify a first parameter of a first object in the first data and a first parameter of a second object in the second data based at least in part on the first parameters of the first and second objects matching, and establish a connection between the first object and the second object based on the identification; and identify a violation of a security policy of the enterprise based on searching the unified data model, wherein the searching comprises leveraging the connection and a second parameter of the first object to find corresponding information in the second data in violation of the security policy.

Example 13 is the computing apparatus of any previous or subsequent example, wherein the program instructions further direct the processing device to responsive to identifying the violation of the security policy, update the corresponding information in the second data of the second monitored system to remediate the violation of the security policy.

Example 14 is the computing apparatus of any previous or subsequent example, wherein: the first parameters of the first and second objects include a user identifier associated with a user account of the first and second monitored systems; the second parameter of the first object includes a role associated with the user account; and the corresponding information in the second data includes an access parameter of a document indicating authorized access to the document by user accounts having a different role than the role associated with the user account, and an indication of access of the document by the user account in violation of the security policy.

Example 15 is the computing apparatus of any previous or subsequent example, wherein: the first parameters of the first and second objects include a user identifier associated with a user account of the first and second monitored systems; the second parameter of the first object includes a terminated employment status associated with the user account; and the corresponding information in the second data includes a valid login key parameter indicating authorized access to the second monitored system by user accounts having an active employment status, and an indication of a valid login key parameter associated with the user account in violation of the security policy.

Example 16 is the computing apparatus of any previous or subsequent example, wherein the program instructions further direct the processing device to: obtain third data from a third monitored system associated with the enterprise; and update the unified data model using the third data, wherein to update the unified data model, the program instructions direct the processing device to: identify a first parameter of a third object in the third data and the first parameter of the second object in the second data based at least in part on the first parameters of the second and third objects matching, establish a connection between the second object and the third object based on the identification, and establish a connection between the first object and the third object based on the connection between the second object and the third object.

Example 17 is the computing apparatus of any previous or subsequent example, wherein to search the unified data model, the program instructions direct the processing device to search the unified data model responsive to receiving, via a user interface, a security policy query that includes indications of the security policy with respect to objects and parameters of the first data and objects and parameters of the second data, and wherein the program instructions further direct the processing device to display an indication of the violation of the security policy on the user interface.

Example 18 is a system including a data collection engine configured to: obtain first data from a first monitored system associated with an enterprise, and obtain second data from a second monitored system associated with the enterprise; a connector engine configured to: generate a unified data model using the first data and the second data, wherein to generate the unified data model, the connector engine is configured to: identify a first parameter of a first object in the first data and a first parameter of a second object in the second data based at least in part on the first parameters of the first and second objects matching, and establish a connection between the first object and the second object based on the identification; and a security policy query engine configured to: identify a violation of a security policy of the enterprise based on searching the unified data model, wherein the searching comprises leveraging the connection and a second parameter of the first object to find corresponding information in the second data in violation of the security policy.

Example 19 is the system of any previous or subsequent example, wherein the security policy query engine is further configured to: responsive to identifying the violation of the security policy, update the corresponding information in the second data of the second monitored system to remediate the violation of the security policy.

Example 20 is the system of any previous or subsequent example, wherein: the system further comprises a user interface engine configured to: provide a user interface, receive a security policy query that includes indications of the security policy with respect to objects and parameters of the first data and objects and parameters of the second data via the user interface, and provide the security policy query to the connector engine; to search the unified data model, the connector engine is configured to search the unified data model responsive to receiving the security policy query; and the user interface engine is further configured to display an indication of the violation of the security policy on the user interface.

What is claimed is:

1. A computer-implemented method, comprising:
obtaining, by a network security system (NSS), first data from a first monitored system associated with an enterprise;
obtaining, by the NSS, second data from a second monitored system associated with the enterprise;
generating, by the NSS, a unified data model using the first data and the second data, wherein generating the unified data model comprises:
identifying a first parameter of a first object in the first data and a first parameter of a second object in the second data based at least in part on the first parameters of the first and second objects matching, and establishing a connection between the first object and the second object based on the identification; and
identifying, by the NSS, a violation of a security policy of the enterprise based on searching the unified data model in response to identifying a change in one or more of the first data and the second data, wherein the searching comprises leveraging the connection and a second parameter of the first object to find corresponding information in the second data that is associated with the second parameter and in violation of the security policy.

2. The method of claim 1, further comprising:
responsive to identifying the violation of the security policy, updating, by the NSS, the corresponding information in the second data of the second monitored system to remediate the violation of the security policy.

3. The method of claim 1, wherein:
the first parameters of the first and second objects include a user identifier associated with a user account of the first and second monitored systems;
the second parameter of the first object includes a role associated with the user account; and
the corresponding information in the second data includes an access parameter of a document indicating authorized access to the document by user accounts having a different role than the role associated with the user account, and an indication of access of the document by the user account in violation of the security policy.

4. The method of claim 1, wherein:
the first parameters of the first and second objects include a user identifier associated with a user account of the first and second monitored systems;
the second parameter of the first object includes a terminated employment status associated with the user account; and
the corresponding information in the second data includes a valid login key parameter indicating authorized access to the second monitored system by user accounts having an active employment status, and an indication of a valid login key parameter associated with the user account in violation of the security policy.

5. The method of claim 1, further comprising:
obtaining, by the NSS, third data from a third monitored system associated with the enterprise; and
updating, by the NSS, the unified data model using the third data, wherein updating the unified data model comprises:
identifying a first parameter of a third object in the third data and the first parameter of the second object in the second data based at least in part on the first parameters of the second and third objects matching,
establishing a connection between the second object and the third object based on the identification, and
establishing a connection between the first object and the third object based on the connection between the second object and the third object.

6. The method of claim 1, wherein identifying the change in the one or more of the first data and the second data comprises receiving a notification from a respective one of the first monitored system or the second monitored system.

7. The method of claim 1, wherein searching the unified data model comprises searching, by the NSS, the unified data model responsive to receiving, via a user interface of the NSS, a security policy query that includes indications of the security policy with respect to objects and parameters of the first data and objects and parameters of the second data, and wherein the method further comprises displaying, by the NSS, an indication of the violation of the security policy on the user interface.

8. The method of claim 7, wherein receiving the security policy query via the user interface of the NSS comprises, by the NSS:
exposing the objects and the parameters of the first and second data in a first code language;
receiving the indications of the security policy in accordance with the first code language; and
converting the indications from the first code language to a second code language native to the unified data model and with which to search the unified data model, facilitating generation of the security policy query.

9. The method of claim 1, wherein searching the unified data model comprises, by the NSS:
receiving, via a user interface of the NSS, a security policy query that includes indications of the security policy with respect to objects and parameters of the first data and objects and parameters of the second data;
enqueuing the security policy query in a queue; and
searching the unified data model based on the enqueued security policy query on a periodic basis.

10. The method of claim 1, wherein:
the first and second objects comprise one of:
a user account,
a document,
a task,
an asset,
and an event; and
the first and second parameters comprise one of:
a user identifier,
a role,
a user status,
a document status,
a document type,
a company category, and
a permissions indicator.

11. The method of claim 1, further comprising:
responsive to identifying the violation of the security policy, outputting, by the NSS, a notification of the violation of the security policy.

12. A computing apparatus comprising:

one or more computer-readable storage media; and program instructions stored on the one or more computer-readable storage media executable by a processor of a device that, based on being read and executed by the processor of the device, direct the processor of the device to:

obtain first data from a first monitored system associated with an enterprise;

obtain second data from a second monitored system associated with the enterprise;

generate a unified data model using the first data and the second data, wherein to generate the unified data model, the program instructions direct the processor of the device to:

identify a first parameter of a first object in the first data and a first parameter of a second object in the second data based at least in part on the first parameters of the first and second objects matching, and establish a connection between the first object and the second object based on the identification; and identify a violation of a security policy of the enterprise based on searching the unified data model in response to identifying a change in one or more of the first data and the second data, wherein the searching comprises leveraging the connection and a second parameter of the first object to find corresponding information in the second data that is associated with the second parameter and in violation of the security policy.

13. The computing apparatus of claim 12, wherein the program instructions further direct the processor of the device to:

responsive to identifying the violation of the security policy, update the corresponding information in the second data of the second monitored system to remediate the violation of the security policy.

14. The computing apparatus of claim 12, wherein:

the first parameters of the first and second objects include a user identifier associated with a user account of the first and second monitored systems;

the second parameter of the first object includes a role associated with the user account; and the corresponding information in the second data includes an access parameter of a document indicating authorized access to the document by user accounts having a different role than the role associated with the user account, and an indication of access of the document by the user account in violation of the security policy.

15. The computing apparatus of claim 12, wherein:

the first parameters of the first and second objects include a user identifier associated with a user account of the first and second monitored systems;

the second parameter of the first object includes a terminated employment status associated with the user account; and the corresponding information in the second data includes a valid login key parameter indicating authorized access to the second monitored system by user accounts having an active employment status, and an indication of a valid login key parameter associated with the user account in violation of the security policy.

16. The computing apparatus of claim 12, wherein the program instructions further direct the processor of the device to:

obtain third data from a third monitored system associated with the enterprise; and update the unified data model using the third data, wherein to update the unified data model, the program instructions direct the processor of the device to:

identify a first parameter of a third object in the third data and the first parameter of the second object in the second data based at least in part on the first parameters of the second and third objects matching, establish a connection between the second object and the third object based on the identification, and establish a connection between the first object and the third object based on the connection between the second object and the third object.

17. The computing apparatus of claim 12, wherein to search the unified data model, the program instructions direct the processor of the device to search the unified data model responsive to receiving, via a user interface, a security policy query that includes indications of the security policy with respect to objects and parameters of the first data and objects and parameters of the second data, and wherein the program instructions further direct the processor of the device to display an indication of the violation of the security policy on the user interface.

18. A system comprising:

a memory;

a data collection engine configured to:

obtain first data from a first monitored system associated with an enterprise, and obtain second data from a second monitored system associated with the enterprise;

a connector engine configured to:

generate a unified data model using the first data and the second data, wherein to generate the unified data model, the connector engine is configured to: identify a first parameter of a first object in the first data and a first parameter of a second object in the second data based at least in part on the first parameters of the first and second objects matching, and establish a connection between the first object and the second object based on the identification; and a security policy query engine configured to:

identify a violation of a security policy of the enterprise based on searching the unified data model in response to identifying a change in one or more of the first data and the second data, wherein the searching comprises leveraging the connection and a second parameter of the first object to find corresponding information in the second data that is associated with the second parameter and in violation of the security policy.

19. The system of claim 18, wherein the security policy query engine is further configured to:

responsive to identifying the violation of the security policy, update the corresponding information in the second data of the second monitored system to remediate the violation of the security policy.

20. The system of claim 18, wherein:

the system further comprises a user interface engine configured to:

provide a user interface, receive a security policy query that includes indications of the security policy with respect to objects and parameters of the first data and objects and parameters of the second data via the user interface, and provide the security policy query to the connector engine;

to search the unified data model, the connector engine is configured to search the unified data model responsive to receiving the security policy query; and the user interface engine is further configured to display an indication of the violation of the security policy on the user interface.

* * * * *